(12) United States Patent
Felt et al.

(10) Patent No.: US 7,363,495 B2
(45) Date of Patent: Apr. 22, 2008

(54) SYSTEM AND METHOD FOR MESSAGE ENCRYPTION AND SIGNING IN A TRANSACTION PROCESSING SYSTEM

(75) Inventors: Edward P. Felt, deceased, late of Matawan, NJ (US); by Sandra V. Felt, legal representative, Matawan, NJ (US); John R. Wells, Scotch Plains, NJ (US)

(73) Assignee: BEA Systems, Inc., San Jose, CA (US)

( * ) Notice: Subject to any disclaimer, the term of this patent is extended or adjusted under 35 U.S.C. 154(b) by 690 days.

(21) Appl. No.: 10/080,358

(22) Filed: Feb. 21, 2002

(65) Prior Publication Data

US 2002/0138735 A1    Sep. 26, 2002

Related U.S. Application Data

(60) Provisional application No. 60/271,106, filed on Feb. 22, 2001.

(51) Int. Cl.
*H04L 9/00* (2006.01)
(52) U.S. Cl. ..................................... 713/170
(58) Field of Classification Search ............... 713/170, 713/185, 150, 176, 181
See application file for complete search history.

(56) References Cited

U.S. PATENT DOCUMENTS

| 4,200,770 | A |   | 4/1980 | Hellman et al. ............... 178/22 |
| 4,937,863 | A |   | 6/1990 | Robert et al. |
| 5,023,907 | A |   | 6/1991 | Johnson ..................... 710/200 |
| 5,438,508 | A |   | 8/1995 | Wyman |
| 5,671,279 | A | * | 9/1997 | Elgamal ...................... 705/79 |
| 5,671,285 | A |   | 9/1997 | Newman ..................... 705/78 |

(Continued)

FOREIGN PATENT DOCUMENTS

WO    WO 00/49766    8/2000

OTHER PUBLICATIONS

RSA Laboratories Technical Note: PKCS #1: RSA Encryption Standard, Version 1.5, Nov. 1, 1993.
RSA Laboratories Technical Note: PKCS #6: Extended-Certificate Syntax Standard, Version 1.5, Nov. 1, 1993.
RSA Laboratories Technical Note: PKCS #7: Cryptographic Message Syntax Standard, Version 1.5, Nov. 1, 1993.

(Continued)

*Primary Examiner*—Ellen Tran
(74) *Attorney, Agent, or Firm*—Fliesler Meyer LLP

(57) ABSTRACT

The invention provides a system and a method which utilizes a combination of message-based encryption and message-based digital signing to ensure the security and authenticity of a message or message buffer sent from one party or process to another in a transaction processing system. In one embodiment the invention includes a method comprising the steps of: creating an encryption envelope by encrypting a message buffer, signing the encrypted contents of said message buffer with a digital signature, sending said encryption envelope from the sender process to the recipient process, receiving the encryption envelope at the recipient process, decrypting said encryption envelope to retrieve said message, and verifying the identity of the sender process by retrieving the digital signature from the encryption envelope. The invention allows intermediate recipients to inspect the message, and provides for reliable authentication, confidentiality, integrity, and non-repudiation, of communicated messages.

26 Claims, 12 Drawing Sheets

U.S. PATENT DOCUMENTS

| | | | |
|---|---|---|---|
| 5,673,315 A | 9/1997 | Wolf | 705/59 |
| 5,758,068 A | 5/1998 | Brandt et al. | |
| 5,790,664 A | 8/1998 | Coley et al. | |
| 5,809,144 A | 9/1998 | Sirbu et al. | 380/25 |
| 5,940,504 A | 8/1999 | Griswold | 705/59 |
| 5,982,891 A | 11/1999 | Ginter | |
| 6,009,173 A * | 12/1999 | Sumner | 713/156 |
| 6,014,688 A | 1/2000 | Venkatraman | 709/206 |
| 6,029,145 A | 2/2000 | Barritz | 705/34 |
| 6,055,413 A | 4/2000 | Morse | 340/7.43 |
| 6,161,181 A * | 12/2000 | Haynes et al. | 713/170 |
| 6,324,578 B1 | 11/2001 | Cox et al. | |
| 6,327,656 B2 | 12/2001 | Zabetian | 713/176 |
| 6,336,186 B1 | 1/2002 | Dyksterhouse et al. | 713/156 |
| 6,446,136 B1 | 9/2002 | Pohlmann | 719/318 |
| 6,609,128 B1 | 8/2003 | Underwood | |
| 6,640,244 B1 * | 10/2003 | Bowman-Amuah | 709/207 |
| 6,691,175 B1 | 2/2004 | Lodrige | 709/310 |
| 6,760,752 B1 * | 7/2004 | Liu et al. | 709/206 |
| 6,766,305 B1 | 7/2004 | Fucarile | 705/51 |
| 6,839,843 B1 | 1/2005 | Bacha et al. | |
| 6,917,976 B1 | 7/2005 | Slaughter | 709/226 |
| 7,143,093 B1 | 11/2006 | Bracho | 707/10 |
| 7,234,103 B1 * | 6/2007 | Regan | 715/500 |
| 2002/0065780 A1 | 5/2002 | Barritz | |

OTHER PUBLICATIONS

RSA Laboratories Technical Note: PKCS #9: Selected Attribute Types, Version 1.1, Nov. 1, 1993.

RSA Laboratories Technical Note: PKCS #10: Certification Request Syntax Standard, Version 1.0, Nov. 1, 1993.

Schneier, Bruce: Applied Cryptography, Second Edition, John Wiley and Sons, Oct. 1995, pp. 30-44, 47-54, 81-82, 185-187. 588-589.

Cohen, et al., "General Event Notification Architecture Base: Client to Arbiter," Sep. 6, 2000, pp. 1-14.

Manezes, Alfred J., Van Oorschot, Paul C., and Vanstone, Scott A., "Handbook of Applied Cryptography," CRC Press, 1997, pp. 386-388, 397-399, 400, 524-527, 547-553, 581-583.

BEA Tuxedo Release 7.1, retrieved from http://edocs.bea.com/tuxedo/tux71/html/dvlibra7.htm on Aug. 23, 2007.

"Statement of Position 97.2—Software Revenue Recognition," Journal of Accountancy v185nl, Jan. 1998, ISSN: 0021-8448, pp. 106-119.

* cited by examiner

SYSTEM AND METHOD FOR MESSAGE ENCRYPTION AND SIGNING IN A TRANSACTION PROCESSING SYSTEM

This application claims priority from provisional application "SYSTEM AND METHOD FOR MESSAGE ENCRYPTION AND SIGNING IN A TRANSACTION PROCESSING SYSTEM," Application No. 60/271,106, filed Feb. 22, 2001, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to transaction processing systems and specifically to a system and method for secure messaging.

BACKGROUND

The ever increasing dependence on electronic communication in the world today has placed greater importance on the need for security in such communication. Many people are familiar with the idea of electronic mail or email and readily recognize the need for security when sending such emails, but rarely see the need for securing electronic data communications between computers, servers, applications, etc. In this situation the parties are not people, but computer software applications, and their communications are not emails, but a series of electronic messages. Such transfer of messages or "messaging" is a core element of modern transaction processing servers, an example of which is the series of BEA Weblogic and BEA Tuxedo products from BEA Systems, Inc., San Jose, Calif.

All of these systems share the common need for secure transmission of messages. Security in this context may also extend to the following features:

Authentication: the ability for one party, for example a client-based software or server-based software to be assured of the identity of another party it is communicating with.

Confidentiality: the ability to prevent disclosure of information to unauthorized parties during the communication process.

Integrity: the ability to detect either malicious or accidental tampering with an electronic communication or a message transmission.

Non-repudiation: the ability to prevent one party from sending a message and later denying that it originated the communicated message.

Traditionally, these security services have only been partially met by the use of either a transitive trust model, a real-time direct security relationship, or a direct authentication model.

In a transitive trust model, a client authenticates itself to a transaction processing system gateway process, and then the gateway process "vouches" for the user by confirming to other system processes the user's identity. This is similar to the "single sign-on" type of system such as is found in Windows NT, that uses trusts to allow users and services be distributed and yet easily accessible throughout the network. The implementation of authentication, confidentiality, and integrity security services depend on cooperation between intermediate system processes.

In the real-time direct authentication model, most commonly encountered in older type client-server systems, a client establishes a direct connection and security relationship with every server-side process. This particular authentication model is very resource-intensive, and does not scale up well for large configurations.

Neither of these models described above fully answer the modern demands for increased messaging security, particularly the desire for a non-repudiation feature. Clearly, an alternative method must be found to satisfy the demands of modern transaction processing.

SUMMARY

The invention combines two well-established technologies-public key encryption and transaction processing, to create a secure system for the transfer of messages in a transaction processing system.

Security within transaction servers is becoming increasingly important as networking and distributed computing technologies evolve. User data and mission-critical computing systems are very attractive targets, and the potential threats from highly capable adversaries are real. Internet connectivity and wide-area corporate intranets have laid the groundwork for intrusion via the same facilities that are an essential component of many systems.

A number of transaction server customers, primarily in the financial industry, have requested public key-based security to protect the privacy and integrity of their data, and also to strengthen user identification and accountability. Message-based encryption enhances the security of the transaction server by preventing customer data from being revealed to any party except a designated recipient. A secondary benefit is some protection against tampering and replay attacks, because these attacks are more difficult when cleartext message content is not available. Message-based digital signature further enhances security by allowing a sending process to prove its identity, and to bind that proof to a specific message buffer. Any third party, at any point in the future, can verify the signature's authenticity. Undetected tampering is not possible, because a digital signature contains a cryptographically secure checksum computed on the entire buffer's contents. A digital signature also contains a tamper-resistant time stamp, based on the originating machine's local (and unsynchronized) clock. An application programmer can examine this time stamp and implement security policies to inhibit replay attacks.

The inventors have concluded that public/private key management and distribution capabilities are a viable means to providing enhanced message security. Aspects of key management are visible to the domain administrator, to end users, and to application developers. The system administrator is responsible for setting security policies for clients, server machines, and gateway links that interact with their server domain. While the administrator sets the general policies, another person or group of people may be responsible for managing security: for example the users, permissions, auditing, policies, etc.

It is highly desirable for message-based encryption and digital signature to be enabled and controlled by administrative parameters, with minimal or no application code modification. This allows an existing application to immediately benefit from these features without undergoing a complete application software development cycle. It also enhances security by reducing the chance of application programming errors leading to security lapses. To address this demand, security services are starting to be offered by operating systems as a "platform" service, similar to device drivers for video or file systems for disk storage. This trend enables a wide variety of customer choice by providing a well-defined interface between application software and the customer's chosen security hardware/software provider. Embodiments of the invention support standard platform security APIs, where available. This may include Microsoft's CryptoAPI on Windows, and Intel's Common Data Security Architecture (CDSA). Specific advancements of the invention include:

1. System enforcement of security policies related to public key encryption and public key digital signatures. Messages may be automatically rejected if their public key properties do not confirm to the administrator's security policies. Specific policy requirements may include for example, A) Requiring that at least one valid public key digital signature is attached to a message; B) Requiring that a message be encrypted for confidentiality; and C) Setting limits on the acceptable range of timestamps associated with a digital signature.
2. A mode of operation to automatically generate public key digital signatures.
3. Automatic verification of digital signatures before a message is delivered.
4. A mode of operation to automatically perform public key encryption.
5. Automatic decryption of messages, with automatic rejection if decryption fails.
6. Provisions to enable partial encryption, so that a system process can route a message based on partial application content data, while maintaining confidentiality of the remaining data.
7. Provisions for certain system processes to decrypt an entire message, in order to make a routing decision based on complete application content data.
8. Integration with reliable disk-based queuing, so that application messages remain encrypted while queued on disk.
9. Integration with publish/subscribe messaging, so that unauthorized subscribers cannot access confidential data.
10. A capability to export messages into an external format that preserves public key digital signatures and public key encryption. A corresponding import facility allows authorized software to decrypt and verify signatures, for non-repudiation, at any point in the future.
11. A Security Provider Interface (SPI) that allows customization of the system's public key features, including operations performed in system processes.
12. Automatic public key signature timestamp generation and verification.
13. High-level programming interfaces for public key encryption and public key digital signature that intuitively mesh with the existing application interface standards for transaction processing.
14. Distributed processing techniques that allow a significant portion of public key algorithm execution to be performed on a client's desktop computer.

Advantages of the present invention include that end users are able to have private, mutually-authenticated, secure interactions with transaction server facilities or other clients. System administrators and system operators benefit from increased system security, especially when interacting with another server domain or/Workstation clients from outside their company. Developers have access to new programming interfaces for data encryption and digital signature. These capabilities may enable new classes of Internet applications that were not previously feasible due to security concerns. Security officers and security auditors have greater assurance that a company's software applications effectively enforce their company's security policies.

In one embodiment the invention includes a method for secure communication of a message from a first server process to a second server process in a transactional processing system, comprising the steps of: marking a message buffer for encryption; marking said message buffer for attachment of a digital signature; creating an encryption envelope by encrypting said message buffer, and signing the encrypted contents of said message buffer with a digital signature; and, sending said encryption envelope from the sender process to the recipient process.

In another embodiment, the invention includes a method for verifying secure communication of a message from a first server process to a second server process in a transactional processing system, comprising the steps of:

receiving an encryption envelope from a sender process; importing said encryption envelope into a message buffer content readable by said recipient process; decrypting said encryption envelope to retrieve said message; and, verifying the identity of the sender process by retrieving said digital signature from said encryption envelope.

DETAILED DESCRIPTION

Figure 1:
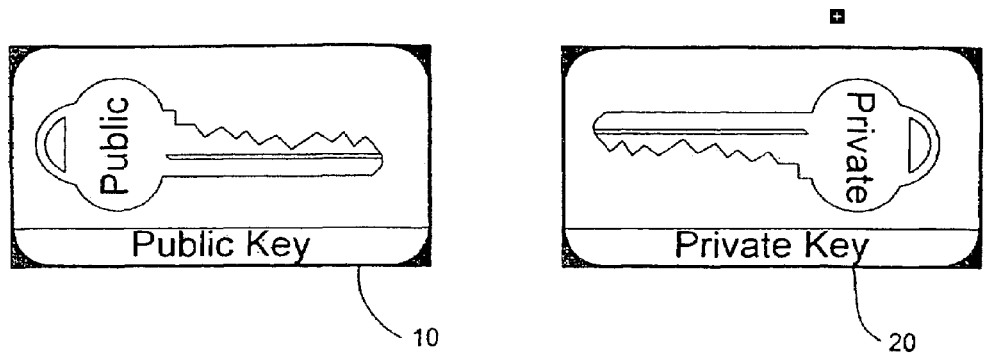
FIG. 1 is a symbolic or pictorial representation of a public key and a private key as used herein for illustrative purposes.

The invention defines a number of public key technology enhancements for use with transactional server, application server, and messaging security systems. The invention ties together two concepts: message-based encryption, and message-based digital signature, into a reliable and secure messaging authentication system. A primary component of the invention is the use of public/private keys and digital signatures, associated with the concept of "enveloping' each message, the content of a message buffer, or a messaged transaction.

The external aspects of this security feature that allow user or administration access include programming interfaces, administrative parameters, and administrative programming interfaces.

A glossary of related terms, acronyms and abbreviations is included below for reference.

Abstract Syntax Notation One (ASN.1): An International Standards Organization (ISO) standard for describing data formats, defined in X.208.

Advanced Encryption Standard (AES): Proposed US Government standard for symmetric encryption with 128, 192, or 256 bit key lengths.

Basic Encoding Rules (BER): An ISO standard for representing ASN.1 self-identifying data independent of platform architecture, defined in X.209.

Certificate Authority (CA): A well-known and trusted entity that issues public-key certificates. A certificate authority attests to a user's real-world identity, somewhat like a Notary Public.

Certificate Revocation List (CRL): A list of certificates that should not be accepted. A certificate is typically revoked if a user's private key is compromised, or if the user leaves an organization.

Cipher Block Chain (CBC): A block encryption mode of operation where output of previous blocks' encrypted state is fed back to influence the encryption of following blocks.

Common Data Security Architecture (CDSA): An industry standard architecture for open, interoperable, cross platform security interfaces.

Composite Signature Status: The overall signature status of a buffer, based on an analysis of the status of all attached digital signatures.

CryptoAPI: A Microsoft interface for cryptographic services provided security modules that may be installed as part of the Windows operating system.

Decryption: Decryption is the process of restoring encrypted data to its original form.

Distinguished Encoding Rules (DER): An ISO standard for representing ASN.1 self-identifying data independent of platform architecture, in a unique and unambiguous fashion, defined in X.509.

DES Encryption: DES is a 56-bit key size symmetric block encryption algorithm.

DSA: Digital Signature Algorithm. A U.S. Government proposed standard algorithm for digital signatures.

DSS: Digital Signature Standard. A U.S. Government proposed standard for computing digital signatures, consisting of SHA-1 for message digest, and DSA for digital signature.

EDE: A triple-DES mode of operation based on 112 bit keys.

Encryption: Encryption is the process of algorithmically transforming data to prevent (or hinder) unauthorized disclosure, while still preserving access to the original data by authorized users.

International Data Encryption Algorithm (IDEA): A 128-bit symmetric block encryption algorithm patented in the United States and Europe by Ascom-Tech AG.

Key: A key is a binary value used to encrypt or decrypt data. Keys are often, but not necessarily, derived from password strings.

LLELink-Level Encryption: a feature common to the TUXEDO product from BEA Systems, Inc., San Jose, Calif., that encrypts traffic over network links. Encryption is performed just before data is transmitted on the network, and decryption is performed just after data is received.

Man in the Middle Attack: An attack where an enemy inserts a machine into a network, capturing, possibly modifying, and then re-transmitting all messages between two parties.

MD5: A message digest algorithm with 128-bit output.

Message Digest: A fixed-size secure hash value computed on a message's contents. Message digest algorithms have the property that it is extremely difficult to generate a message corresponding to an arbitrary digest value, or to find two distinct messages with the same digest value. If any single bit in a message is changed, a message digest calculation will, with extremely high probability, yield a different result.

Non-repudiation: The inability of a message originator to falsely deny authorship.

Pass Phrase: A secret string of alphanumeric and other characters, usually provided by a human being to prove identity. A pass phrase is typically longer than a password.

PAC: Privilege Attribute Certificate: a temporary digital certificate, often issued at logon time, that contains role, level, or group membership information about the user, for the purpose of authorizing access to various resources.

Private Key: The part of a public/private key pair used by the key's owner for decryption or signature generation.

Public Key: The part of a public/private key pair used by anyone for encryption or signature verification.

Public Key Certificate: A data structure containing a public key with associated identifying information. The information might include a user's name, organization, email address, etc., plus key-specific information such as its creation date, expiration date, issuer id, and serial number. The issuing Certificate Authority digitally signs both the public key and the associated information, to create a verifiable and tamper-proof binding between a public key and a particular user.

Public/Private Key Encryption: An encryption technology based on a public key for encryption, and a related but different private key for decryption.

RC2 Encryption: RC2 is a variable-key-size symmetric block encryption algorithm that has good performance when implemented in software.

RC4 Encryption: RC4 is a variable-key-size symmetric streaming encryption algorithm that has excellent performance when implemented in software.

Replay Attack: An attack where message(s) are intercepted and then re-inserted into a system in the future, causing an operation, such as depositing money, to be re-executed fraudulently.

RSA: Rivest, Shamir, and Adleman—the inventors of a public key algorithm widely employed for encryption and digital signatures. The RSA algorithm is asymmetric: a private key is closely held by its owner, while a corresponding public key may be widely disseminated.

RSA Inc.: A subsidiary of Security Dynamics Corporation, licenses software for many cryptographic algorithms (including but not limited to the "RSA" algorithm).

Seal: Encrypt a message for privacy.

Session Key: A session key is a temporary symmetric encryption key generated and used only for the duration of a single session (network connection).

SHA-1: A message digest algorithm with 160-bit output.

Sign: Attach a digital signature to a message for originator authentication and message integrity protection.

Smart Card: A physical device, usually the same size as a credit card, which contains an embedded microprocessor and non-volatile memory. Smart cards often perform authentication, cryptographic operations, and hold identity information such as private key(s) and certificate(s).

Security Support Provider Interface (SSPI): A Microsoft programming interface for interacting with Windows security.

Symmetric Key Encryption: Traditional encryption technology where the same key performs both encryption and decryption.

Two-Factor Authentication: A strong form of authentication requiring possession of a physical entity (such as a smart card or fingerprint) as well as a secret (such as a password or pin code).

X.509: An International Standards Organization specification for public-key certificate format and associated operational protocols. Version 3 provides for application-specific extensions.

As used herein the term "transaction server" is used to refer to any computer server that performs transactions, or communications with a client, a service or another server. The transaction server need not necessarily be a physical host computer but can be simply a server software application running as perhaps one of many on a computer system or distributed network. The transaction server may be considered one party in the entire messaging process—it sends and receives messages to other parties, much like one person would send and receive mail to and from other people. A key difference in this analogy is that people typically send isolated and distinct email messages, whereas transaction servers often transmit and receive the contents of message buffers, and may do so on a continuous basis. As such a message buffer may not contain a nicely packaged and distinct set of data like an electronic mail package. For this reason transaction servers require their own special systems for handling secure communication of the message buffer.

This is the area the invention primarily targets, through the use of private/public key encryption, and certificate signing. Public key-based security can be used to protect the privacy and integrity of transaction data, and also to strengthen user identification and accountability. Message-based encryption enhances the security of the transaction server by preventing data from being revealed to any party except a designated recipient. A secondary benefit of encryption is protection against tampering and replay attacks, because these attacks are more difficult when clear-text message content is not available. Message-based digital signatures further enhance transaction security by allowing a sending process to prove its identity to a recipient, and to bind that proof to a specific message buffer. A third party or intermediary can then verify the signature's authenticity. Tampering is easily detected, because a digital signature contains a cryptographically secure checksum computed on the entire buffer's contents. A digital signature may also contain a tamper-resistant time stamp, based on the originating machine's local clock. Applications can examine this time stamp and implement security policies to inhibit replay attacks.

Thus public/private key management and distribution capabilities are a viable means to providing enhanced message security. Depending on the implementation used, aspects of key management can be made visible to a transaction server or domain administrator, to end users, and to application developers. Typically, the system administrator is responsible for setting security policies for clients, server machines, and gateway links that interact with their server domain. While the administrator sets the general policies, another person or group of people may be responsible for managing security: for example the users, permissions, auditing, policies, etc. To suit these needs, the invention allows message-based encryption and digital signature to be enabled and controlled by administrative parameters, with minimal or no application code modification. This allows an existing application to immediately benefit from these features without undergoing a complete application software development cycle. Embodiments of the invention support standard platform security APIs, where available for ease of access and integration.

FIG. 1 shows an illustration of a symbolic or pictorial representation of a public key 10 and private key 20. The symbols shown in FIG. 1 are merely symbolic or pictorial representations of public and private keys that are shown here for ease of illustrating the invention. It will be evident to one skilled in the art that real-life keys will not represent the symbols used to represent them herein. Public/Private key algorithms (often just referred to as "public key algorithms") include systems such as RSA public key encryption, which uses an asymmetric algorithm in which a private key is closely held by its owner, while a corresponding public key is widely disseminated. The private key is thus the part of a public/private key pair used by the key's owner for decryption or signature generation. The public key is the part of a public/private key pair used by anyone other than the owner for encryption or signature verification.

Figure 2:
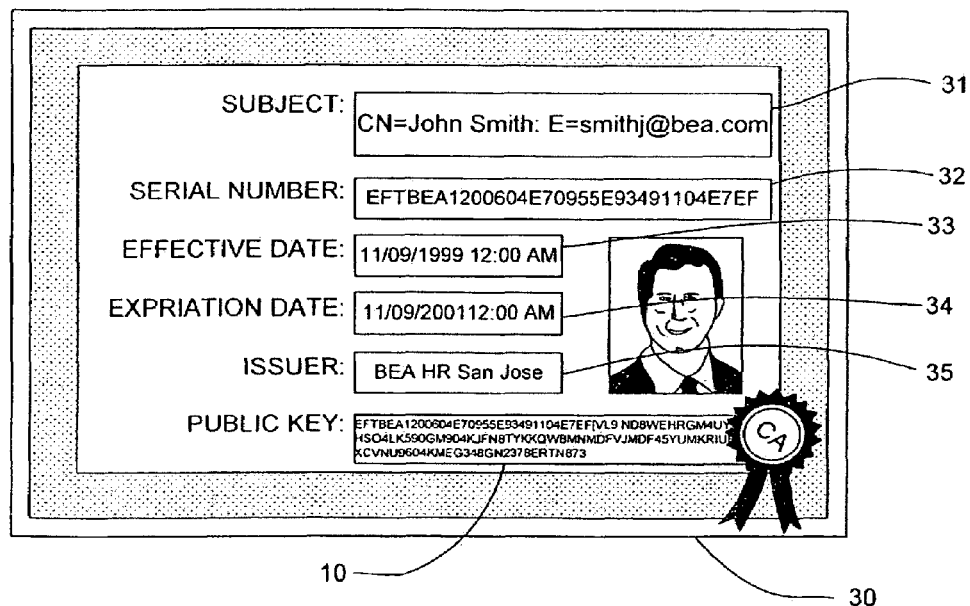
FIG. 2 is a symbolic or pictorial representation of a digital certificate as used herein for illustrative purposes.

FIG. 2 shows an illustration of a symbolic or pictorial representation of a digital certificate 30. As with the public and private keys described above, the certificate shown in FIG. 2 is merely a symbolic or pictorial representation shown here for ease of illustrating the invention. Real-life certificates do not necessarily have, or are limited to, each component shown, nor are the components necessarily distributed as shown in FIG. 2. A certificate is typically a data structure containing a public key with associated identifying information. The information might include a user's name, organization, email address, etc., plus key-specific information such as its creation date, expiration date, issuer id, and serial number. An issuing Certificate Authority digitally signs both the public key and the associated information, to create a verifiable and tamper-proof binding between a public key and a particular user. As shown in FIG. 2, the digital certificate may include such elements as the users identity characteristics 31, an assigned certificate serial number 32, an effective data 33, an expiration data 34, a certificate issuer identification 35, and a copy of the user's public key 10.

Figure 3:
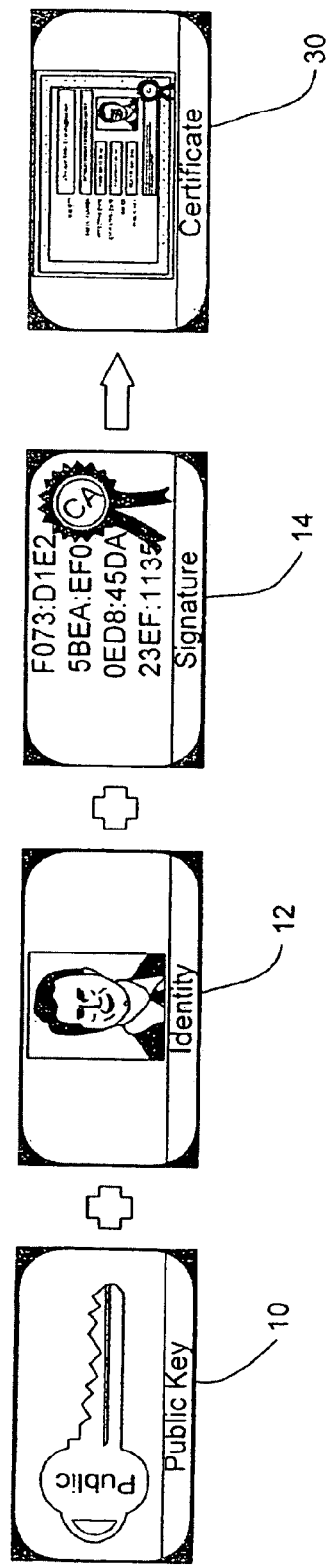
FIG. 3 is a schematic of a digital certificate creation process.

FIG. 3 illustrates the creation of a digital certificate as a public key 10 is merged with a users identity 12 and a digital signature 14 to create the digital certificate 30.

Figure 4:
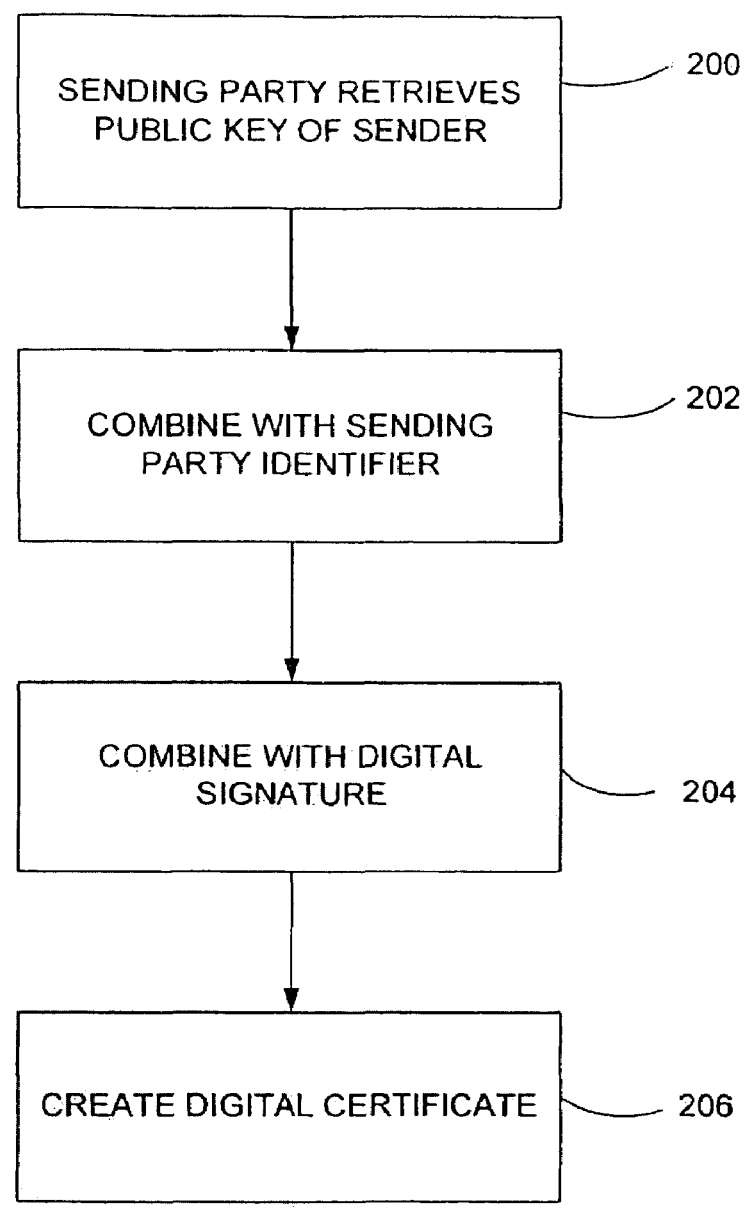
FIG. 4 is a flowchart of a digital certificate creation process.

FIG. 4 shows the steps used to create the certificate. As shown in the flow chart of FIG. 4 the sending party first retrieves the public key of the sender (step 200), combines it with a sending party identifier (step 202) and a digital signature (step 204) to create the digital certificate (step 206).

Message or Message Buffer Encryption

Message encryption enhances transaction server security by enabling private communication. Data privacy is considered essential for most applications that transport data over the Internet, either between companies or between a company and the general public. It also is critical for applications deployed over insecure internal networks. Message encryption also helps ensure message integrity, because it is more difficult for an attacker to modify a message when the contents are obscured. The message-based encryption feature disclosed herein provides data privacy using public-key encryption technology. Message buffers are sealed within an "opaque" digital envelope, so that only a designated recipient may read them. There is no need for the two communicating parties to have a pre-established shared secret to exchange private messages, nor is there any need to consult a trusted third party in real time. The scope of message-based encryption is "end-to-end." This means that a message is encrypted just before it leaves the originating process, and remains encrypted until it is received by the final destination process. It is opaque at all intermediate transit points, including operating system message queues, system processes, disk-based queues, and during network transmission over inter-server network links. Encryption is performed when crossing process boundaries. There is no distinction between networked communication or intra-machine communication.

Sealing a message buffer involves three steps:

First, it is necessary to identify the target recipient's identity. Only this target recipient will have access to the message's contents. The target might be a client, a particular service, a server group, a gateway group, a particular server machine, or an entire domain of servers. The encryption and sealing process can be specified as an process that is automatically handled by the system, perhaps on a recipient-specific basis, or one that can be simply specified on an as needed basis.

The second step is to associate the encryption key with a particular buffer.

The final step is actual encryption of the message buffer, and attachment of a digital encryption envelope which enables a designated recipient to decrypt the message. This takes place just before the buffer is about to be transmitted outside the originating process. If a "sealed" buffer is transmitted more than once, a new encryption process takes place each time. This allows a buffer to be modified after a desire to seal it is registered.

Figure 5:
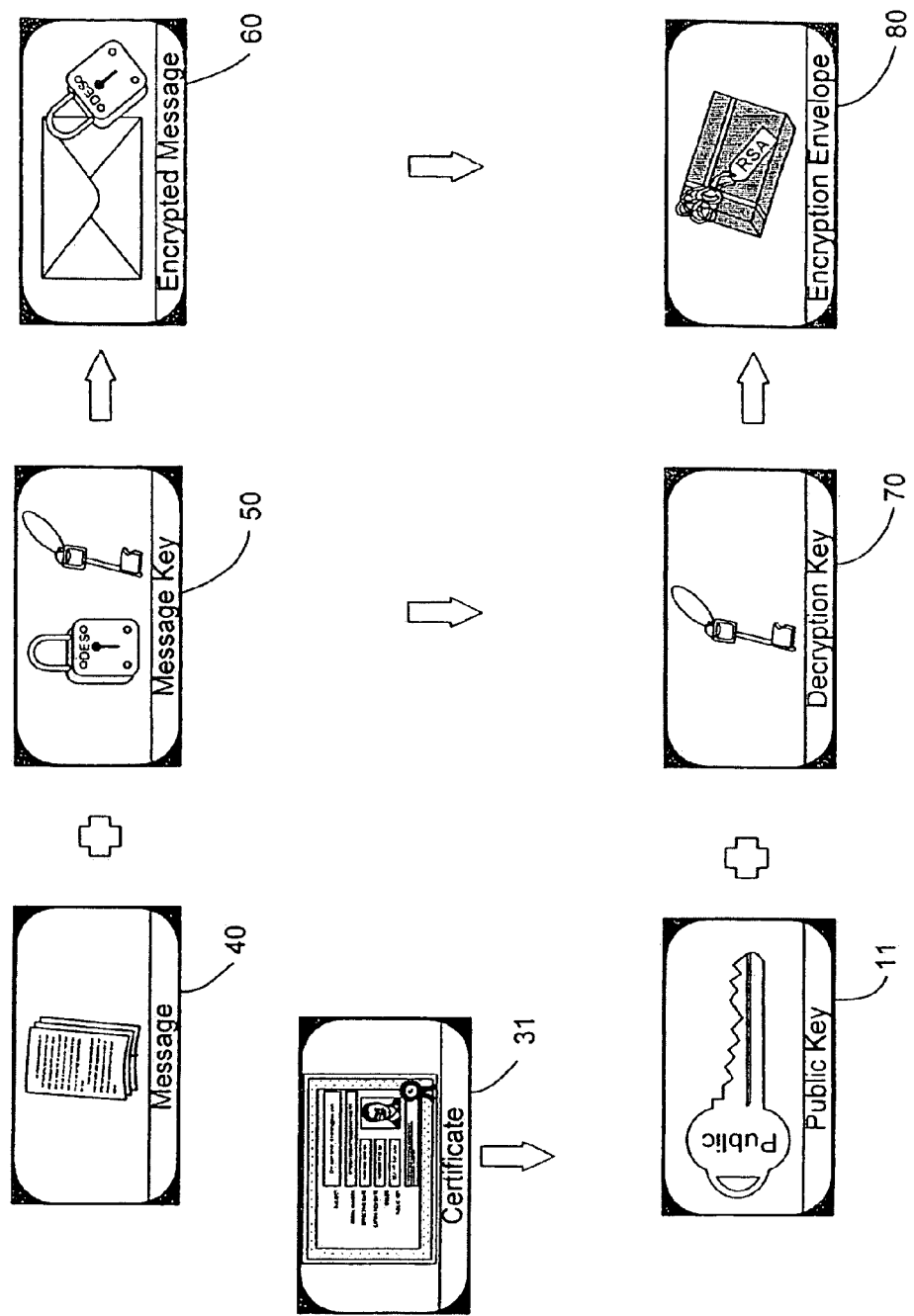
FIG. 5 is a schematic of a message encryption process in accordance with an embodiment of the invention.

FIG. 5 shows a schematic of a message encryption process in accordance with an embodiment of the invention. As shown in FIG. 5 a message (or the contents of a message buffer) 40, is combined with a message key 50, to create an encrypted message 60. The message key may be created in any number of ways but in one embodiment is created using a pseudorandom number generator to generate a substantially different message key for each message. The message and message key are also used to create a decryption key 70. At the same time the recipient's digital certificate 31 is used to retrieve the recipients public key 11, which can then be combined with the decryption key 70 and the encrypted message 60, to form an encryption envelope 80. The encryption envelope, containing an encrypted message buffer is then sent to the receiving party or recipient.

Figure 6:
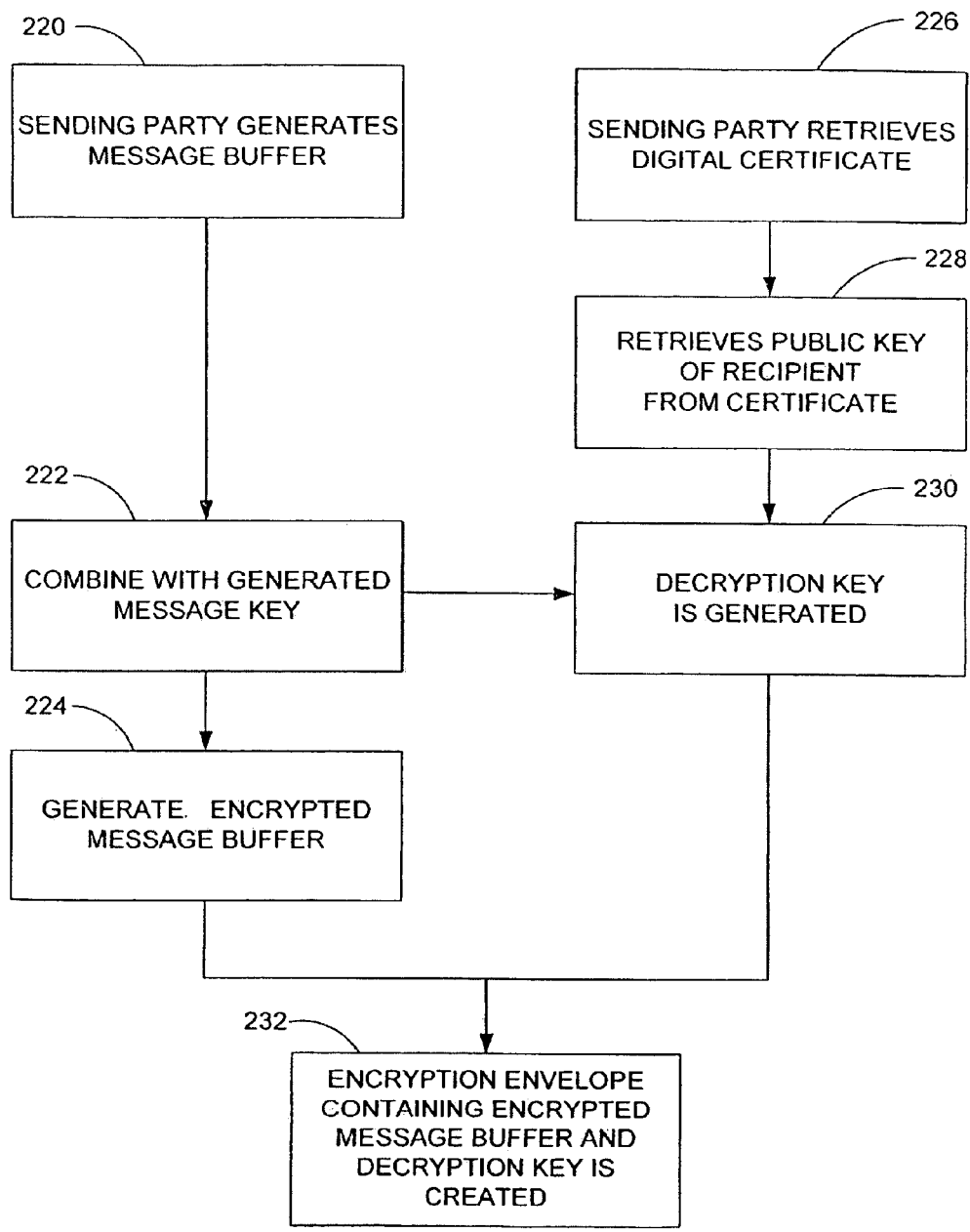
FIG. 6 is a flowchart of a message encryption process in accordance with an embodiment of the invention.

FIG. 6 shows a flowchart of the message encryption process. In step 220 the sending party generates a message buffer. This is combined with a message key (step 222) to create an encrypted message buffer (step 224). At the same time, the sending party retrieves the recipients digital certificate (step 226), and determines from that their public key (step 228). A decryption key can then be generated in step 230 using this public key and the message key previously generated in step 222. The sender then prepares an encryption envelope containing both the encrypted message buffer, and the decryption key (step 232).

Figure 7:
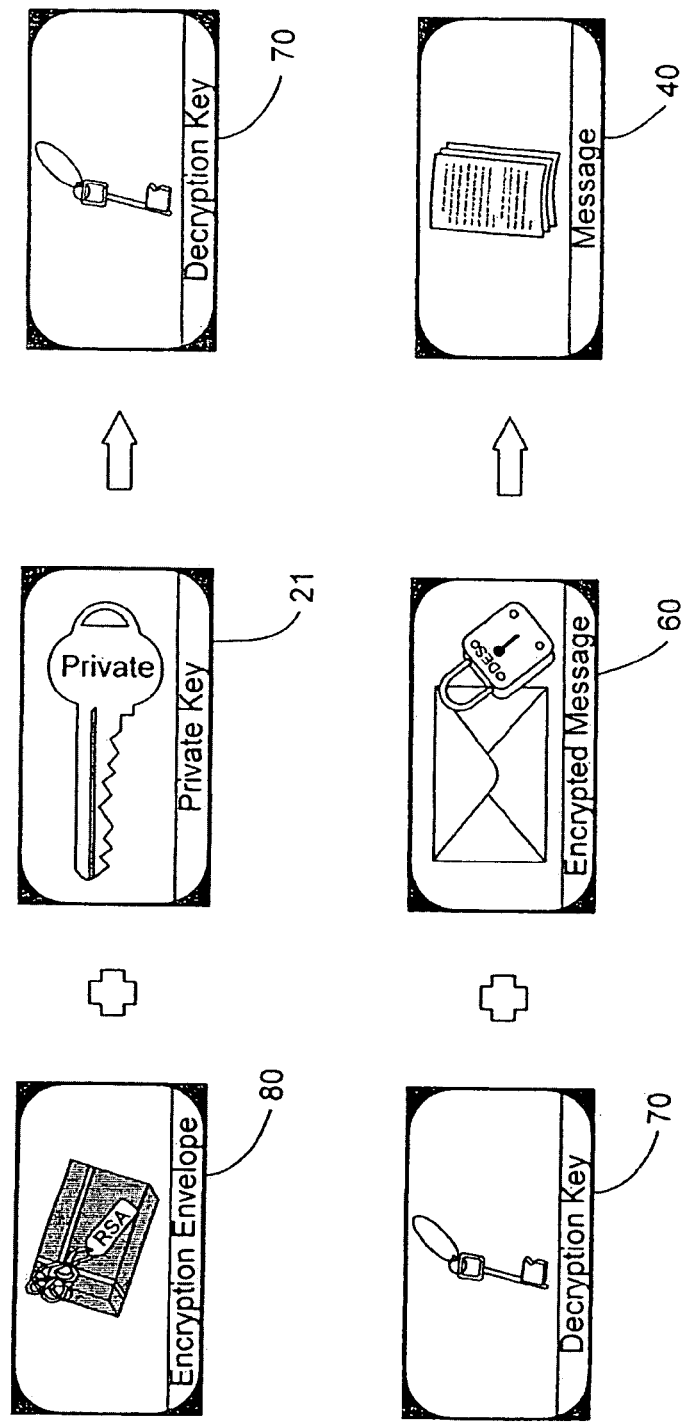
FIG. 7 is a schematic of a message decryption process in accordance with an embodiment of the invention.

FIG. 7 shows a schematic of a message decryption process in accordance with an embodiment of the invention. As shown in FIG. 7 the receiving party receives an encryption envelope 80. The recipients private key 21 is used to open the envelope and retrieve the decryption key 70. This decryption key can then be used to unlock the encrypted message 60 and produce the original message or message buffer 40.

Figure 8:
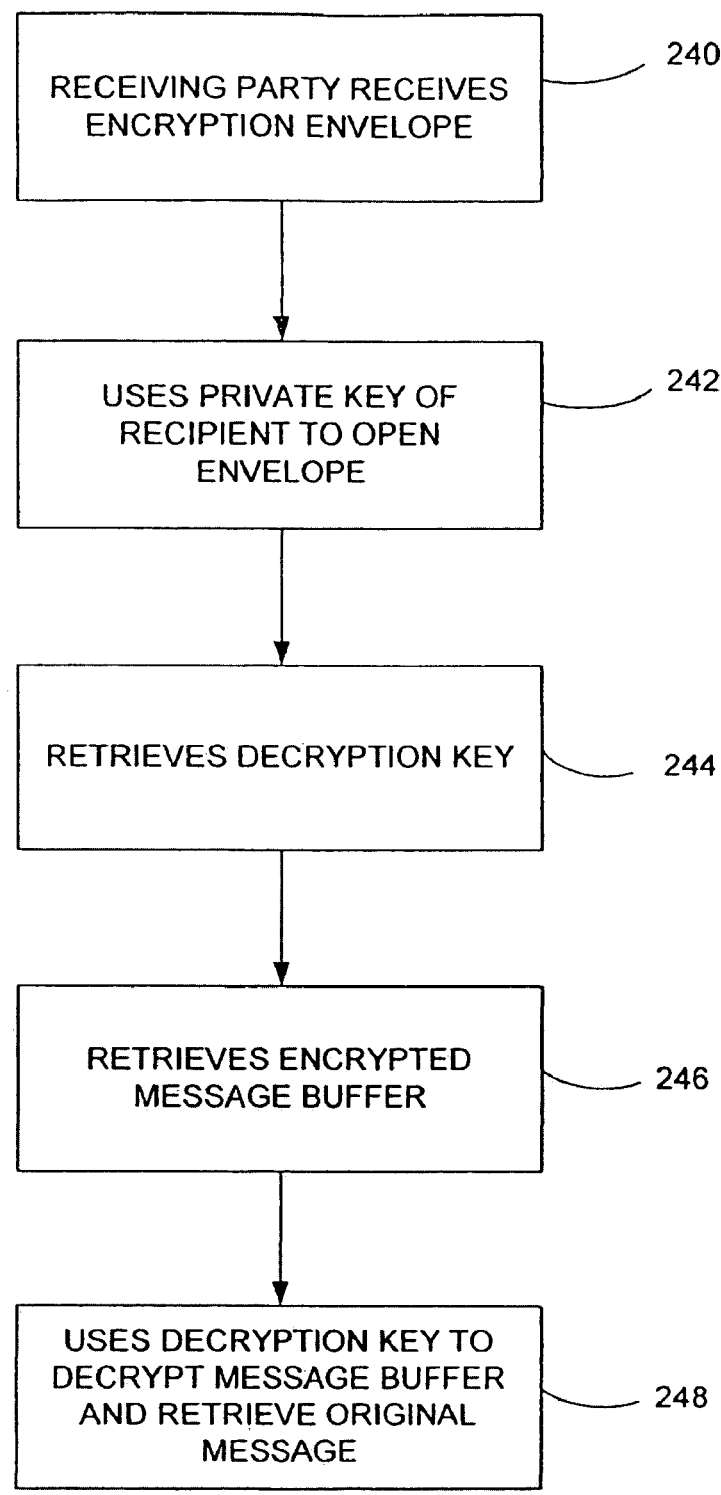
FIG. 8 is a flowchart of a message decryption process in accordance with an embodiment of the invention.

FIG. 8 shows a flowchart of the message decryption process. In step 240 the receiving party (the recipient) receives an encrypted message, or the contents of a message buffer, within an encryption envelope. The recipient uses their private key to open the envelope (step 242) and retrieve the decryption key (step 244). The encrypted message or message buffer is then extracted (step 246), and the decryption key is used to decrypt it, to form the original message (step 248).

Figure 9:
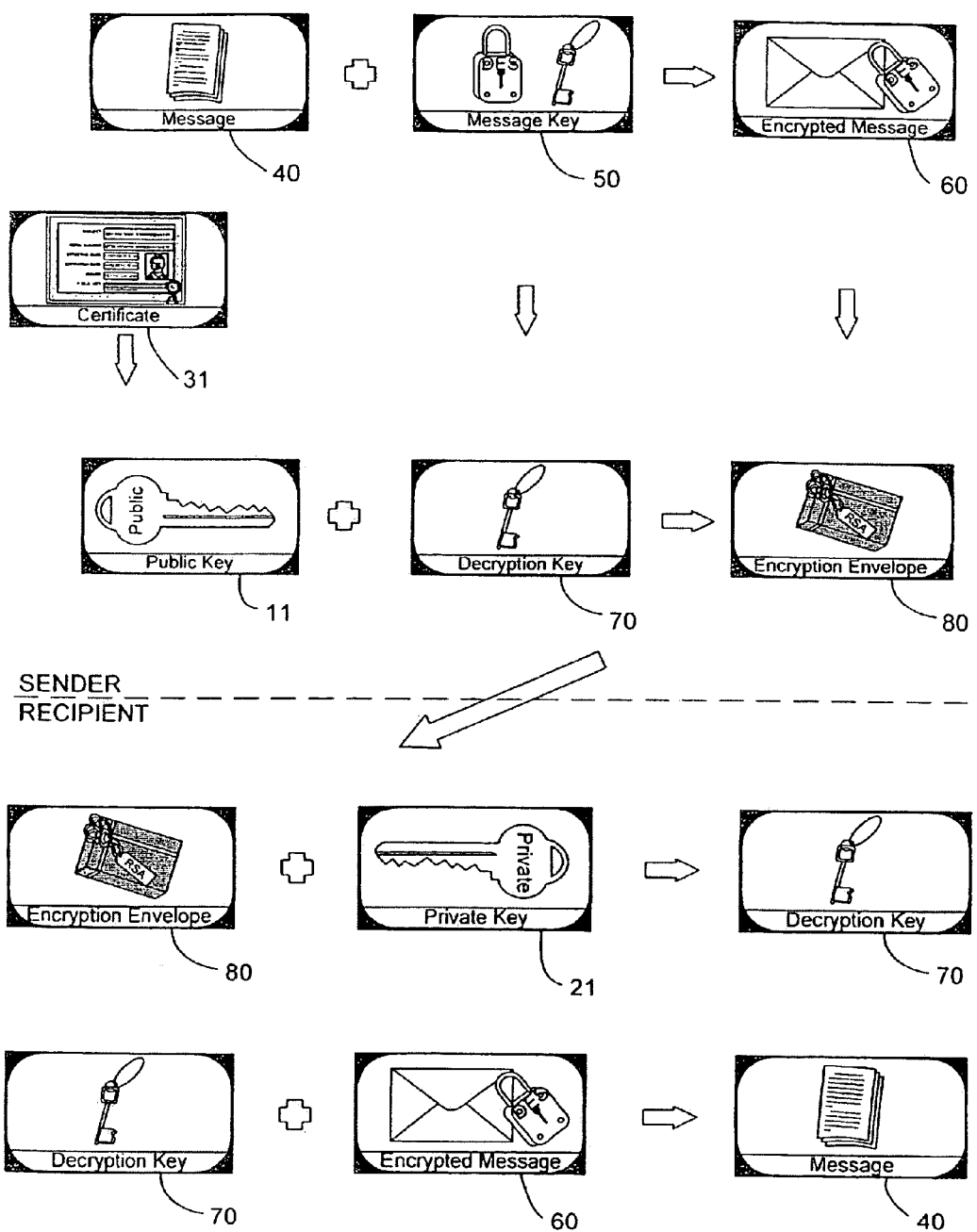
FIG. 9 is a schematic of a message encryption and decryption process in accordance with an embodiment of the invention.

FIG. 9 is a schematic of a message encryption and decryption process in accordance with an embodiment of the invention. As shown in FIG. 5, at the sender's end a message (or the contents of a message buffer) 40, is combined with a message key 50, to create an encrypted message 60. The message key may be created in any number of ways but in one embodiment is created using a pseudorandom number generator to generate a substantially different message key for each message. The message and message key are also used to create a decryption key 70. At the same time the recipient's digital certificate 31 is used to retrieve the recipients public key 11, which can then be combined with the decryption key 70 and the encrypted message 60, to form an encryption envelope 80. The encryption envelope, containing an encrypted message buffer is then sent to the receiving party or recipient. At the recipient's end, the receiving party receives an encryption envelope 80. The recipients private key 21 is used to open the envelope and retrieve the decryption key 70. This decryption key can then be used to unlock the encrypted message 60 and produce the original message or message buffer 40. The process described by FIG. 9 may be considered a combination of those steps shown and described previously in FIGS. 6 and 8, i.e., the sending party generates a message buffer. This is combined with a message key to create an encrypted message buffer. At the same time, the sending party retrieves the recipients digital certificate, and determines from that their public key. A decryption key can then be generated using this public key and the message key previously generated. The sender then prepares an encryption envelope containing both the encrypted message buffer, and the decryption key. The recipient receives the encrypted message, or the contents of a message buffer, within an encryption envelope. The recipient uses their private key to open the envelope and retrieve the decryption key. The encrypted message or message buffer is then extracted, and the decryption key is used to decrypt it, to form the original message.

Message or Message Buffer Signing

Message-based digital signatures enhance transaction server security by allowing a message originator to prove its identity, and to bind that proof to a specific message buffer. Mutually authenticated and tamper-proof communication is considered essential for most applications that transport data over the Internet, either between companies or between a company and the general public. It also is critical for applications deployed over insecure internal networks. The scope of this authentication and integrity checking may be considered "end-to-end", in that the message buffer is protected from the time it leaves the originating process until the time it is received at the destination process. In this manner, the message is protected at all intermediate transit points, including temporary message queues, disk-based queues, system processes, transmission over inter-server network links, etc. In one embodiment of the invention, the originating user signs a message buffer with a signature. The signature can be then later read by an intermediary or final user or application simply by looking at the message envelope. The user may be a person using the transaction server itself, or equally likely may be a user application, or another application. The signature contains a cryptographically secure checksum of the message buffer's contents. Any party with access to the message buffer may verify that the originating user's signature is authentic, and that the message buffer contents are unchanged. Time-independent verification by a third party provides a property known as non-repudiation. This means that the originator cannot later deny authorship or claim the message was altered.

A time stamp, based on the message signer's local clock, can be attached to the signature. The time stamp is included as an authenticated attribute in the checksum calculation, so that tampering with the time stamp value will be detected when a signature is verified. The signature time stamp may be based on an unsynchronized clock, in which case it cannot be fully trusted, especially if the signature is generated on a PC or personal workstation. However, this feature is useful in that a server may choose to reject requests with time stamps too old or too far in the future. This provides a measure of protection against replay attacks.

Signatures are generated and verified when crossing process boundaries. There is no distinction between networked communication or intra-machine communication.

Signing a buffer involves three steps:

First, the signing party must have access to a private signature key. This key is highly protected, and possession of it is equivalent to possessing the signing party's identity.

Second, a desire or setting to sign the buffer, and associated signature parameters, are indicated and remembered. This can be handled automatically by the system or via a call to a message buffer signing function. Signature parameters are remembered and associated with the buffer for later use.

The final step is the actual signature generation, and takes place automatically whenever the buffer is about to be transmitted outside the originating process. If a "signed" buffer is transmitted more than once, a new signature is generated for each communication. This allows a buffer to be modified after a desire to sign it is registered.

Figure 10:
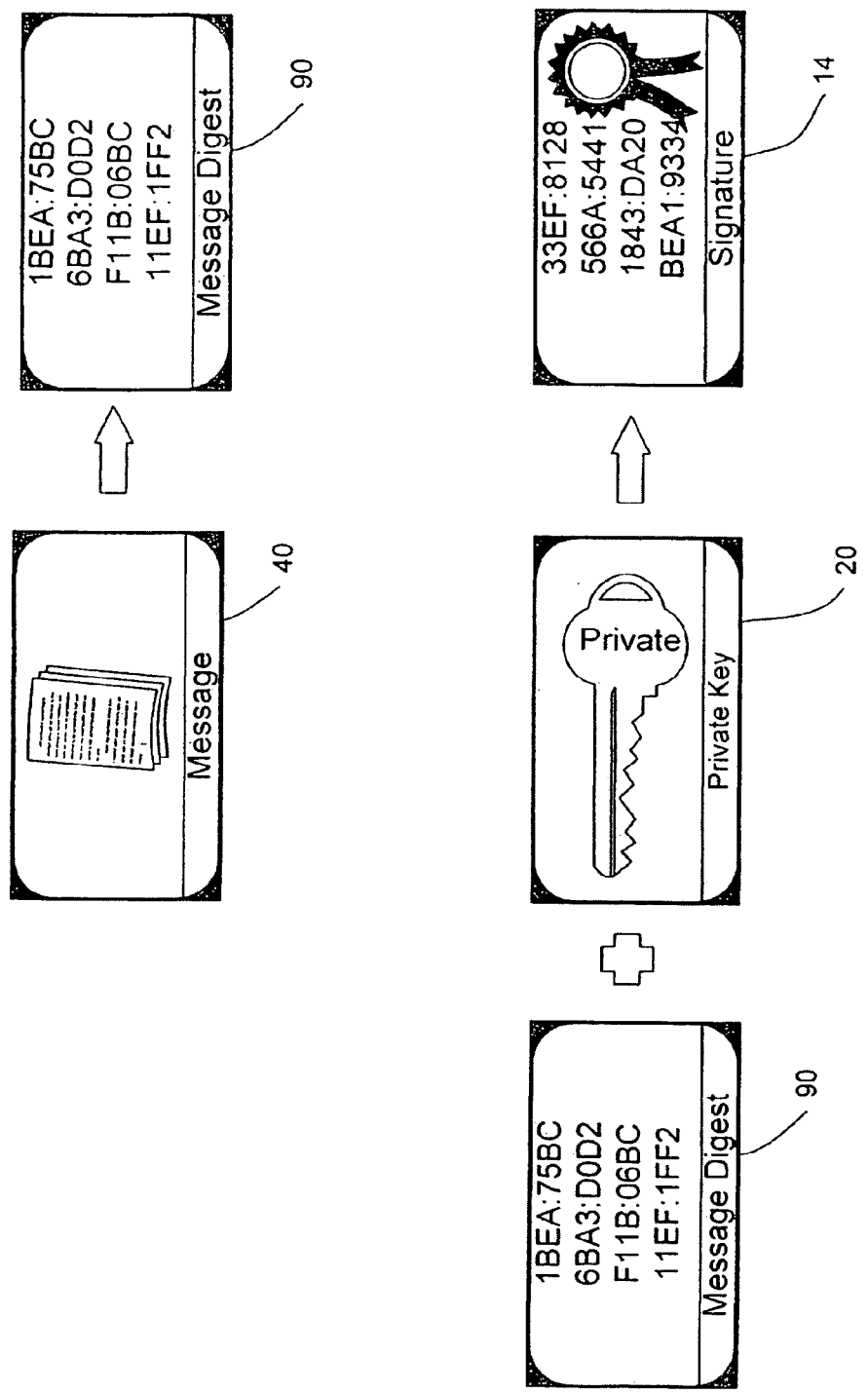
FIG. 10 is a schematic of a digital signature creation process in accordance with an embodiment of the invention.

FIG. 10 shows a schematic of a digital signature creation process in accordance with an embodiment of the invention. As shown in FIG. 9 a message 40 is generated, and from this a message digest 90 is created. This message digest is combined with the private key of the sender 20 to create a message signature 14.

Figure 11:
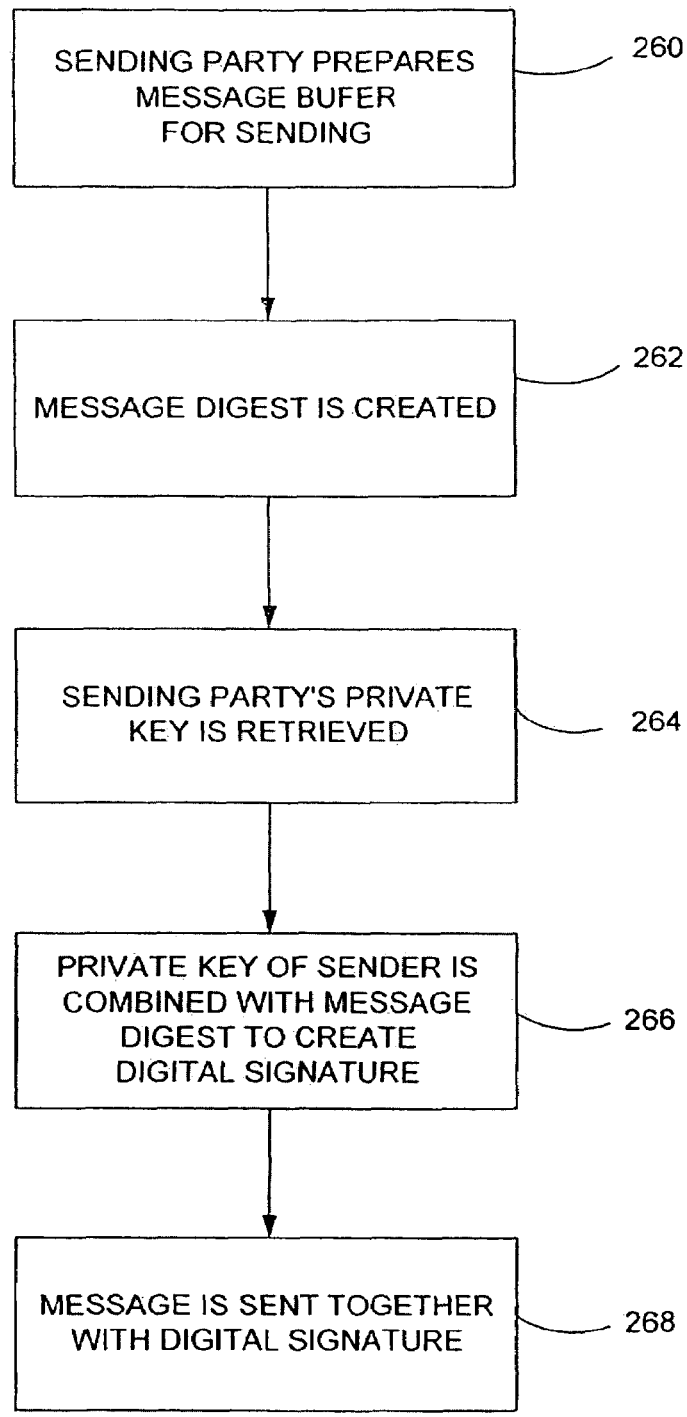
FIG. 11 is a flowchart of a digital signature creation process in accordance with an embodiment of the invention.

The process used to do this is shown in FIG. 11. In step 260 the sending party prepares a message buffer for sending to the recipient a message digest is created (step 262), and the sending party's private key retrieved (step 264). The private key is combined with the message digest in step 266 to create a digital signature for this message. The digital signature is then sent together with the message, in step 268, to the receiving party.

Figure 12:
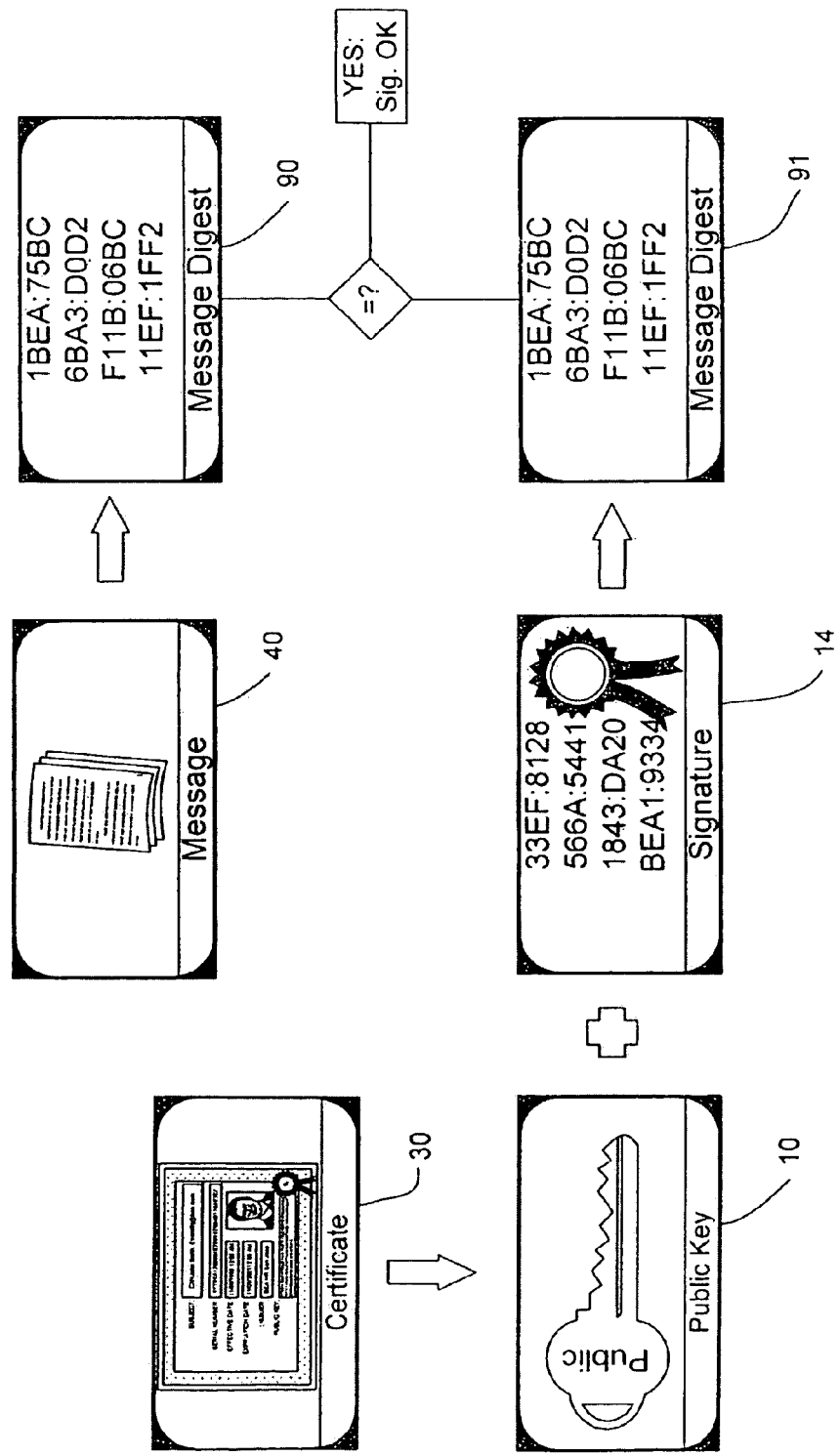
FIG. 12 is a schematic of a digital signature verification process in accordance with an embodiment of the invention.

FIG. 12 shows a schematic of a digital signature verification process in accordance with an embodiment of the invention. As shown in FIG. 11 message 40 is used to generate a message digest 90. At the same time, in order to determine the validity of the message sender the senders certificate 30 is used to retrieve the senders public key 10. The public key is combined with the message signature 14 to determine another version of the message digest 91. If message digest 90 and message digest 91 are found to be equal, then the message is deemed to be valid and has been indeed sent from the identified sender.

Figure 13:
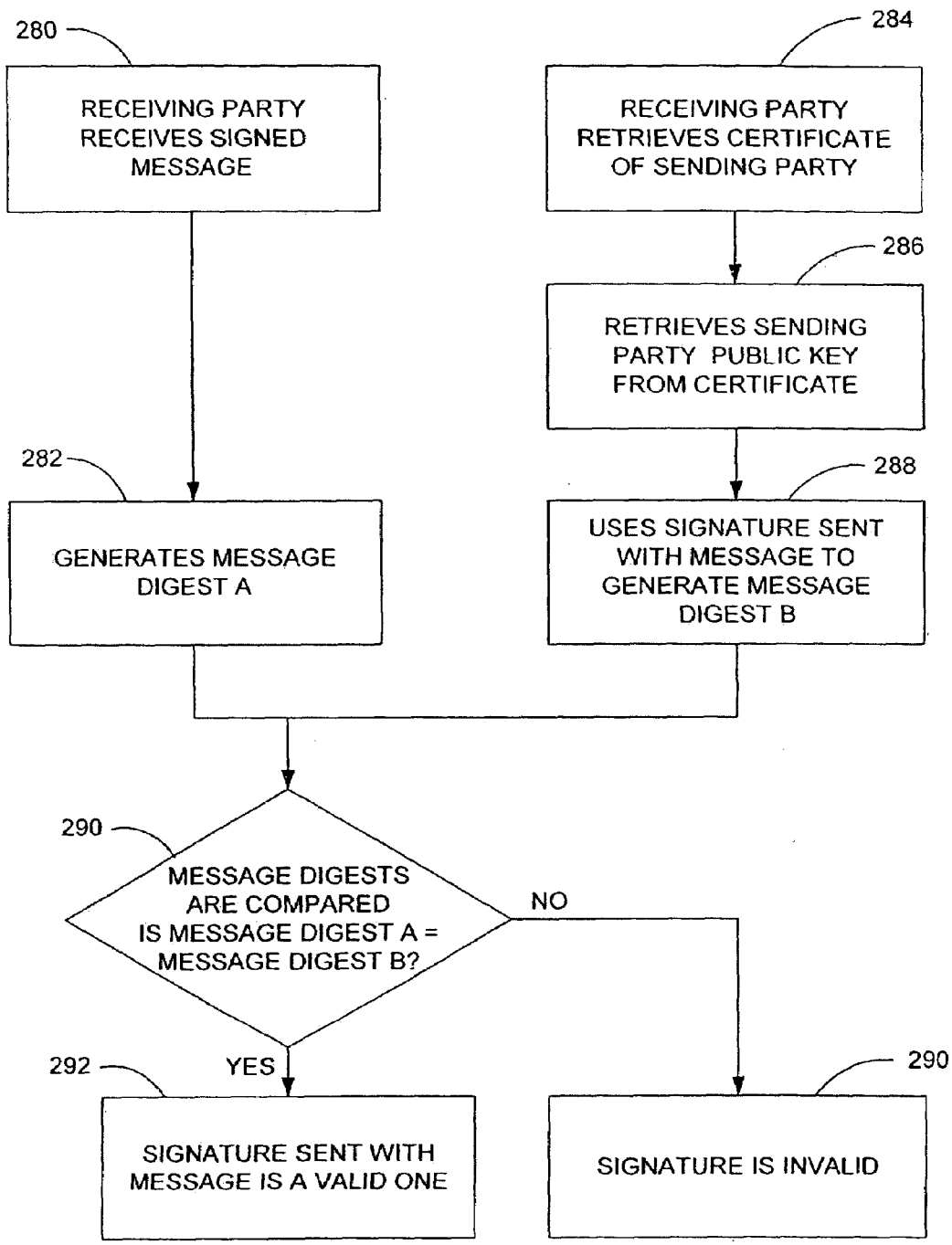
FIG. 13 is a flowchart of a digital signature verification process in accordance with an embodiment of the invention.

FIG. 13 shows a flowchart of the digital signature verification process. In step 280, the receiving party receives a signed message. A message digest A is created (step 282). At the same time the recipient reads the sending party's certificate (step 284) to determine the public key of the sender (step 286). The recipient may then generate another version of the message digest by using the public key and the message signature (step 288). In step 290 message digest A and message digest B are compared, and if they are found to be identical, then the message is deemed to have arrived from a valid identified sender (step 292). If they differ (step 294) then the signature, and hence the identity of the sending party, is invalid.

Implementation Details

The following sections detail particular message buffer encryption and digital signing implementations that can be used with the an embodiment of the invention. It will be evident to one skilled in the art that the invention is not limited to the particular implementations described below, but that other implementations may be developed within the spirit and scope of the invention.

Message-based Encryption

Message-based data encryption enhances transaction server security by enabling private communication. Data privacy is considered essential for most applications that transport data over the Internet, either between companies or between a company and the general public. It also is critical for applications deployed over insecure internal networks.

Message-based data encryption also helps ensure message integrity, because it is more difficult for an attacker to modify a message when the contents are obscured.

The message-based encryption feature disclosed herein provides data privacy using public-key encryption technology. Message buffers are sealed within an "opaque" digital envelope, so that only a designated recipient may read them. There is no need for the two communicating parties to have a pre-established shared secret to exchange private messages, nor is there any need to consult a trusted third party in real time.

The scope of message-based encryption is "end-to-end." This means that a message is encrypted just before it leaves the originating process, and remains encrypted until it is received by the final destination process. It is opaque at all intermediate transit points, including operating system message queues, system processes, disk-based queues, and during network transmission over inter-server network links.

Encryption is performed when crossing process boundaries. There is no distinction between networked communication or intra-machine communication.

Sealing a message buffer involves three steps:

First, it is necessary to identify the target recipient's identity. Only this target recipient will have access to the message's contents. The target might be a client, a particular service, a server group, a gateway group, a particular server machine, or an entire domain of servers. The target recipient is represented by a key of type TPKEY_ENCRYPT (for discrete encrypt and seal) or TPKEY_AUTOENCRYPT (for automatic encrypt and seal).

The second step is to associate the encryption key with a particular buffer. This happens automatically in the case of a TPKEY_AUTOENCRYPT key, or explicitly via tpseal( ) in the case of a TPKEY_ENCRYPT key.

The final step is actual encryption of the message buffer, and attachment of a digital encryption envelope which enables a designated recipient to decrypt the message. This takes place just before the buffer is about to be transmitted outside the originating process. If a "sealed" buffer is transmitted more than once, a new encryption process takes place each time. This allows a buffer to be modified after a desire to seal it is registered.

In one embodiment the transaction server supports a variety of algorithms for bulk encryption of message contents including:

RC2, a variable key-size block cipher, with a key size range of 40 to 128 bits.

DES, a 56-bit block cipher, run in CBC mode.

14. Triple DES, a 112-bit block cipher, run in EDE mode. Other encryption algorithms may be used while remaining withing the spirit and scope of the invention. Encryption strength is controlled by key property ENCRYPT_BITS, and the algorithm is controlled by key property ENCRYPT_ALG. An application can query a key property by calling tpkey_getinfo( ), and attempt to set a key property by calling tpkey_setinfo( ).

If a key property specifies an encryption algorithm or key length that is unavailable, for example due to licensing restriction, then encryption operations performed with that key will fail.

When an algorithm with fixed key length is set in ENCRYPT_ALG, the ENCRYPT_BITS key property is automatically adjusted to match.

If a message recipient needs to verify a certain level of encryption strength, it is possible to call tpenvelope( ) on a received message to get a key handle, and then to obtain encryption algorithm details via tpkey_getinfo( ).

More than one digital encryption envelope can be associated with a message buffer. This allows multiple parties, with different private keys, to receive and decrypt an encrypted message.

The temporal order in which encryption envelopes are attached via tpseal( ) is maintained, and can be reported by tpenvelope( ). Encryption envelopes automatically associated with a message buffer, from TPKEY_AUTOENCRYPT keys, are appended after explicitly requested recipients. The relative order of these automatically generated encrypted envelopes is indeterminate. The relative order of signature and encryption envelopes reported by tpenvelope( ) is indeterminate.

Additional message size overhead due to another recipient is unrelated to the message buffer's data content size. Specifically, when a message is encrypted for multiple recipients, it is not acceptable to generate more than one encrypted copy of the buffer's contents.

If several encryption envelopes are associated with a message buffer, they must agree on the bulk data encryption algorithm and the bulk data encryption algorithm's key size.

If a buffer is passed to an application interface such as an ATMI interface, as an output parameter, then any previously attached encryption envelope information is deleted. This includes any pending seals, or seals from previous uses of the buffer. A new set of encryption seal information might be associated with the new buffer content, after successful completion of the operation.

If a buffer is passed to an application interface as an input parameter, for example through tpacall( ), then any previously attached encryption seal information is ignored and discarded. For example, if a server process receives an encrypted buffer as input, encryption seal information related to its transmission to the server process is attached and available for examination via tpenvelope( ). However, if the buffer is re-transmitted by the server, it is not encrypted for these recipients. It is encrypted only for new recipients with pending seals, as specified by tpseal( ) calls made by the server itself. This prevents potential leaks of information to parties authorized to receive only the original message, and not the server's modifications.

An externalized format for encrypted buffers enables "pass through" transmission of encrypted data, and also long-term storage of encrypted buffers.

The tpexport( ) function creates an externalized representation of a message buffer, including any associated digital signatures or encryption envelopes. The buffer is processed as if it were being transmitted to another process by an application interface, including encryption and digital signature processing. The tpimport( ) function converts an externalized representation back into a message buffer, performing decryption and signature verification if necessary.

The externalized buffer is stored in PKCS-7 format. tpexport( ) and tpimport( ) can also optionally generate/accept a base64 encoding of the PKCS-7 data, if a printable string representation of the buffer is desired.

The tpenvelope( ) function returns information about a message buffer's attached encryption envelopes.

In an originating process, encryption requests registered by tpseal( ) are remembered and associated with a message. These encryption envelopes are reported by tpenvelope( ) with state TPSEAL_PENDING. Pending encryption envelopes that would result from TPKEY_AUTOENCRYPT keys are also reported by tpenvelope( ) in the TPSEAL_PENDING state. However, these encryption envelopes might not be attached if the originating process closes the automatic encryption key before the message is actually sent.

In a receiving process, encryption envelopes attached by the originator are reported by tpenvelope( ) with state TPSEAL_OK. The public encryption key associated with an encryption envelope is returned by tpenvelope( ). Using this key, one may query for encryption parameters that were in effect, such as bulk data encryption algorithm or bulk data encryption bit size. Encryption envelopes do not have time stamps associated with them.

Automatic encryption reduces the number of function calls a process must make. It also enhances security by reducing the likelihood that a message will be transmitted without encryption, due to programming errors.

An encrypted message buffer can be automatically decrypted when it enters a transaction process. This includes client and server process, plus certain system processes which need to access a message's contents. If the system process is acting as a pass-through conduit, without reading the message's contents, it is not decrypted.

In order for automatic decryption to succeed, the receiving process must have opened a decryption key (type TPKEY_DECRYPT) corresponding to one of the attached encryption envelopes.

To enable decryption, the process must prove its right to act under the target principal's identity and access the principal's private key. One form of proof is to supply a secret pass phrase or password. Proof requirements may vary, depending on security provider.

A service may require that all incoming request messages are encrypted, based on an administrative policy. If this policy is in effect, an unencrypted incoming service request message will not be honored.

A service may require that all incoming conversational messages, sent via tpconnect( ) or tpsend( ), are encrypted, based on an administrative policy. If this policy is in effect, an incoming unencrypted message will not be honored.

Some subsystems and gateway processes may require encryption for all incoming event posting messages, based on administrative policy. If this policy is in effect, an unencrypted incoming posting buffer will not be honored.

It is possible for a message buffer to be both signed and encrypted. There is no required relationship between the number of digital signatures and the number of encryption envelopes associated with a message buffer. When both processes are performed on a message buffer, signatures are generated first, on unencrypted data. The number of attached signatures and the identity of signing parties are then obscured by the encryption envelope(s).

Signature verification is potentially more difficult when a message is both signed and sealed. A suitable decryption key must be available to access message data before signature(s) may be verified. This limits the ability of system process to enforce system policies regarding signature requirements. If an encrypted message's contents cannot be accessed, the composite signature status is considered to be TPSIGN_UN-KNOWN.

A digitally signed message buffer may be represented in PKCS-7 format, as "EnvelopedData" content type. In one embodiment the specific options chosen include:

PKCS-7 version 0 EnvelopedData format.
Message content is a composite of buffer type string, buffer subtype string, and buffer data.

15. Message content may be compressed with a "deflate" algorithm before encryption.
    If data content padding is required by the bulk encryption algorithm (i.e. DES or 3DES) padding format is as specified by PKCS-7.
    If both PKCS-7 signatures and PKCS-7 encryption envelopes are needed, these procedures are applied sequentially: SignedData content type is compressed and then enveloped by EnvelopedData content type. The less capable SignedAndEnvelopedData content type is not used.

Several message transformations take place during the processes of digital signature and message encryption. It is important that these transformations are applied in the correct order, so that a message may be handled by intermediate processes running on various machines types. The processing sequence in one embodiment is:

1. Prepare the message buffer for transmission, by invoking its present operation as specified by the buffer type switch.
2. Encode the buffer in a machine-neutral format, by invoking its encdec operation as specified by the buffer type switch. Unlike normal operation with unsigned/unencrypted buffers, this step is mandatory because the machine type of all intervening machines and the final recipient is not known to the originator, and intermediate machines might not have access to necessary decryption or signature keys needed to encode the buffer at a later time.
3. Concatenate the buffer type string, the buffer subtype string, and the encoded buffer contents from step 2.
4. Generate zero, one, or a plurality of digital signature attachments in PKCS-7 SignedData format.
5. Compress the PKCS-7 SignedData output, using the Deflate compression algorithm. Compression is mandatory, because it potentially enhances the strength of most bulk data encryption algorithms. Compression will also hopefully compensate for the extra overhead of signature and encryption envelope attachments.
6. Generate a pseudo-random message encryption key suitable for the selected bulk data encryption algorithm. This temporary key is employed once and then discarded.
7. Encrypt the message in PKCS-7 EnvelopedData format, for one or more previously specified recipients.

Message-based Encryption Software Interfaces

The software and administrative interfaces described below can be used to control aspects of the encryption process in accordance with one embodiment of the invention. It will be evident to one skilled in the art that other and/or additional interfaces and functions can be used, and that the invention is not limited to the interfaces described below.

tpseal( )
    tpseal( ) marks a message buffer for generation of an encryption envelope. The encryption process is actually performed in the future, whenever the message buffer is about to be transmitted from the process.

tpenvelope( )
    tpenvelope( ) returns status information about a message buffer's attached digital signature(s) and encryption envelope(s). Attached items are numbered zero through N-1, and tpenvelope( ) returns information about the item at a specific position. It also is possible to remove an item from a buffer's occurrences list by specifying the TPKEY_REMOVE flag to tpenvelope( ).

tpexport( )
    tpexport( ) converts a message buffer to an externalized representation, which includes any associated digital signatures or encryption envelopes.

tpimport( )
    tpimport( ) converts an externalized representation back into a message buffer. During this process decryption is performed, if necessary, and any attached digital signatures are verified.

tpkey_open( ), tpkey_getinfo( ), tpkey_setinfo( ), tpkey_close( )
    These functions allow an application to manage its private key(s) for performing decryption and its public keys representing recipients of encrypted data. Keys are represented and manipulated via handles. There are different key types, for different purposes. A key may play one or more of these roles:
    Encryption: the key represents and identifies the intended recipient of an encrypted message.
    Decryption: the key identifies the calling process as the principal allowed to decrypt a private message, and provides access to the principal's private key necessary for decryption.
    Signature generation: the key identifies the calling process as a specific principal authorized to generate a digital signature under the principal's identity, and provides access to the principal's private key necessary to produce a signature.

Signature verification: the key represents and identifies a principal associated with a digital signature.

Encryption options may be read with tpkey_getinfo( ) and set with tpkey_setinfo( ). The ENCRYPT_ALG key attribute controls the bulk data encryption algorithm, and the ENCRYPT_BITS attribute controls the bulk data encryption algorithm's key length.

If a key expires or is revoked after it is opened, the key holder need not be notified immediately. There is no requirement to check a key's status on every use. However, other processes may not accept signature or encryption envelopes produced with an expired key.

Message-based Encryption Administrative Interfaces

A number of administrative parameters related to message-based encryption policies can be specified:

Incoming Message Encryption Enforcement Policy: ENCRYPTION_REQUIRED

This is a Y/N parameter which may be specified at multiple levels in the configuration hierarchy. If this policy is specified, any incoming message subject to one or more Y configuration values must be protected by an encryption envelope.

At the domain level (T_DOMAIN class or *RESOURCES section), this parameter covers all application services advertised within the domain, including those advertised by gateway processes. The default value is N.

At the machine level (T_MACHINE class or *MACHINES section), this parameter covers all application services advertised on a particular machine, including those advertised by gateway processes. The default value is N.

At the group level (T_GROUP class or *GROUPS section), this parameter covers all application services advertised by a particular group, including those advertised by gateway processes. The default value is N.

At the service level (T_SERVICE class or *SERVICES section), this parameter covers all instances of a particular service advertised within the domain, including advertisement by gateway processes. The default value is N.

These policies apply only to application services, application events, or application enqueue requests. They do not apply to system-generated service invocations, system event postings, timeout messages, transaction management messages, or other system messages.

It may be desirable in certain customer environments to require encrypted messages for event postings, to protect the associated message buffer's data privacy. When a posted message buffer is encrypted, encryption envelopes are preserved and forwarded along with the encrypted message buffer contents to subscribers for that event.

In a Tuxedo system, if the TMUSREVT system server process is running in a domain, machine, or server group that requires encryption, it will reject any unencrypted incoming posting message. System events (those posted by the system itself and processed by the TMSYSEVT system server process) are never encrypted, and the administrative policies regarding encryption do not apply to the TMSYSEVT server.

Possible subscription notification actions the TMUSREVT server might take include invoking a service or enqueuing a message. If the target service or queue requires encrypted input, but the posted message was not encrypted, the subscription notification action will fail. Also, if the subscriber does not possess an appropriate decryption key, the event notification action will fail.

It may be desirable in certain customer environments to require encryption for messages stored in a reliable disk-based queue, to protect the associated message buffer's data privacy. When a queued message buffer is encrypted, this status is preserved in the queue and the buffer is returned encrypted to the dequeuing process. If the message is processed by TMQFORWARD to invoke a service, encryption status is also preserved.

If the TMQUEUE system server process is running in a domain, machine, or server group that requires encryption, it will reject any unencrypted incoming enqueue request. In addition, the TMQUEUE server process requires encryption if such a policy is in effect for the service name associated with the queue space.

Remote workstation clients are susceptible to message capture attacks. It therefore might be desirable for the system to enforce a policy requiring encryption for all message buffers transmitted by a client. For security reasons, this policy requirement must be enforced at the incoming gateway process, not in the client library functions.

If the gateway process is running in a domain, machine, or server group that requires encryption, it will reject any incoming message containing an unencrypted application data buffer.

Message-Based Encryption Failure Reporting and Auditing

If a process receives an encrypted message but does not possess an open decryption key matching one of the message's encryption envelopes, these actions are taken:

A userlog( ) error message is generated.

A security violation system event is posted.

The buffer is discarded as if it were never received by the process.

If a process that requires encrypted input, based on an administrative parameter settings, receives an unencrypted message, these actions are taken:

A userlog( ) error message is generated.

A security violation system event is posted.

The buffer is discarded as if it were never received by the process.

Message-based Digital Signature

As described briefly above, message-based digital signatures enhance transaction server security by allowing a message originator to prove its identity, and to bind that proof to a specific message buffer. Mutually authenticated and tamper-proof communication is considered essential for most applications that transport data over the Internet, either between companies or between a company and the general public. It also is critical for applications deployed over insecure internal networks. The scope of this authentication and integrity checking may be considered "end-to-end", in that the message buffer is protected from the time it leaves the originating process until the time it is received at the destination process. In this manner, the message is protected at all intermediate transit points, including temporary message queues, disk-based queues, system processes, transmission over inter-server network links, etc.

In one embodiment of the invention, the originating user signs a message buffer using a tpsign( ) function. The signature can be then later read by a user using a tpenvelope( ) function. The user may be a person using the transaction server itself, or equally likely may be a user application, or another application. This signature contains a cryptographically secure checksum of the message buffer's contents. Any party with access to the message buffer may verify tht the originating user's signature is authentic, and that the message buffer contents are unchanged. Time-independent verification by a third party provides a property known as non-repudiation. This means that the originator cannot later deny authorship or claim the message was altered.

A time stamp, based on the message signer's local clock, is then attached to the signature. The time stamp is included as an authenticated attribute in the checksum calculation, so that tampering with the time stamp value will be detected when a signature is verified. The signature time stamp may be based on an unsynchronized clock, in which case it cannot be fully trusted, especially if the signature is generated on a PC or personal workstation. However, this feature is useful in that a server may choose to reject requests with time stamps too old or too far in the future. This provides a measure of protection against replay attacks.

Signatures are generated and verified when crossing process boundaries. There is no distinction between networked communication or intra-machine communication.

Signing a buffer involves three steps:

First, the signing party must have access to a private signature key. This key is highly protected, and possession of it is equivalent to possessing the signing party's identity.

Second, a desire or setting to sign the buffer, and associated signature parameters, are indicated and remembered. This might happen automatically or via an explicit call to a tpsign( ) function. Signature parameters are remembered and associated with the buffer for later use.

The final step is the actual signature generation, and takes place automatically whenever the buffer is about to be transmitted outside the originating process. If a "signed" buffer is transmitted more than once, a new signature is generated for each communication. This allows a buffer to be modified after a desire to sign it is registered.

A digitally signed message buffer can be represented in PKCS-7 format, as a "SignedData" content type. In this particular embodiment, specific options may include:

PKCS-7 version 1 format.

Signing party's X.509v3 certificate may be included.

Message digest and signature algorithm identifiers may be included.

Timestamp based on local clock may be included as an authenticated attribute.

Message content may be a composite of buffer type string, buffer subtype string, and buffer data.

Other digital signature contents may be used while remaining within the spirit and scope of the invention.

Whenever a signature is generated, a timestamp from the local system's clock is attached. The timestamp itself is included in the signature's checksum calculation as an authenticated attribute, and therefore is bound to the associated message buffer data and also protected from tampering. Time resolution is to the second, and timestamps are stored in PKCS-9 "SigningTime" format.

In one embodiment the transaction server may support a variety of signature modes for computing signatures on a message buffer such as:

1. SHA-1 message digest algorithm with RSA public key signature.
2. SHA-1 message digest algorithm with DSA public key signature.
3. MD5 message digest algorithm with RSA public key signature.

A digital signature and associated user certificate need not be based on the same algorithm or key size.

More than one signature can be associated with a message buffer. Different signatures may be based on different message digest or signature algorithms.

Signatures are attached using the tpsign( ) function and reported using the tpenvelope( ) function. The recipient may examine any attached signatures in the temporal order in which signatures were attached. Signatures automatically attached to a message buffer are appended after other signatures. The relative order of these signatures is indeterminate.

If a buffer is passed to an application interface as an output parameter, then any previously attached signature information associated with the buffer is deleted. This includes any pending signatures, or signatures from previous uses of the buffer. A new set of signatures might be associated with the new buffer content, after successful completion of the operation. As referred to herein, an "application interface" is a set or library of programming procedures which can be used for example to send a request from one program to another, to send a named service request from one component to another, or to have one program or component enqueue data to stable storage for later retrieval by another. One example of such an application interface is the Application to Transaction Manager Interface (ATMI) from BEA Systems, Inc., San Jose, Calif., a procedure library that is a superset of the Open Group's X/OPEN XATMI interface and that allows C and COBOL procedures to share a consistent interface.

If a buffer is passed to an application interface as an input parameter, then any previously attached signatures are verified and transmitted. For example, if a server process receives a signed buffer as input, signs it, and then forwards it to another service without change, both the original signature and the new signature are transmitted. This enables a secure, verified hand-off of information with signatures from multiple processes.

However, if the server modifies the buffer, the original signature is no longer valid. This is detected by the transmitting process, and the invalid signature is silently discarded as a side-effect of the application interface operation.

An externalized format for signed buffers enables "pass through" transmission of signed data, and also long-term storage of signed buffers for non-repudiation.

A tpexport( ) function creates an externalized representation of a message buffer, including any associated digital signatures or encryption envelopes. The buffer is processed just as if it were being transmitted to another process by an application interface including encryption and digital signature processing.

A tpimport( ) function converts an externalized representation back into a message buffer, performing decryption and signature verification if necessary.

The signing party must present a key handle associated with a digital certificate and private key in order to generate a signature. This key handle represents the signing party's identity. If a message buffer has a digital signature attached, the signature can be automatically verified when the buffer is received by another server process. A process may obtain detailed information about a buffer's attached signatures by calling the tpenvelope( ) function.

It is possible that a process might receive a signed message buffer, and then modify the buffer's contents. This has the side effect of invalidating attached signatures. In this case tpenvelope( ) cannot verify previously attached signatures, and reports the signature status as TPSIGN_TAMPERED_MESSAGE.

In an originating process, signature requests registered by tpsign( ) are remembered and associated with a message. These signatures are reported by tpenvelope( ) with state TPSIGN_PENDING. Pending signatures that would result from TPKEY_AUTOSIGN keys are also reported by tpenvelope( ) in the TPSIGN_PENDING state. However, these signatures might not be generated if the originating process closes the automatic signature key before the message is actually sent.

Digital signatures are verified whenever a signed message buffer enters a transaction process. This includes client and server processes, and some system processes. In general, whenever a system process needs to access a message's contents, any attached digital signature(s) and the message's integrity are verified. If the system process is acting as a pass-through conduit, without reading the message's contents, attached digital signature(s) need not be verified.

Each individual signature is examined and classified into one of the following states:

TPSIGN_OK: The signing party's certificate is issued by a recognized CA, the CA's certificate signature is valid, the certificate is not expired (with respect to the signature's timestamp), the timestamp is not too old or too far in the future, and the associated digital signature is verified.

TPSIGN_UNKNOWN: The signing party's certificate is issued by an unknown CA, and therefore neither the certificate nor the message buffer signature can be trusted.

TPSIGN_EXPIRED: The signature is not recognized because it was created too long ago.

TPSIGN_EXPIRED_CERT: The signing party's certificate appears to be valid, but has expired (with respect to the signature's timestamp).

TPSIGN_POSTDATED: The signature is not recognized because its timestamp is dated too far into the future.

TPSIGN_REVOKED_CERT: The signing party's certificate has been revoked.

TPSIGN_TAMPERED_CERT: The signing party's certificate claims to be issued by a recognized CA, but appears to be tampered with (for example, because the CA's digital signature fails verification).

TPSIGN_TAMPERED_MESSAGE: The signing party's certificate is valid but the message buffer contents (or the associated local timestamp) appear to have been tampered with.

It is possible for zero, one, or a plurality of digital signatures to be attached. In one embodiment, the composite signature status of a message buffer is determined by examining the status of each signature, and applying the following rules (in order) to get the overall status:

1. If any signature is TPSIGN_TAMPERED_MESSAGE, the result is TPSIGN_TAMPERED_MESSAGE.
2. If any signature is TPSIGN_TAMPERED_CERT, the result is TPSIGN_TAMPERED_CERT.
3. If any signature is TPSIGN_REVOKED_CERT, the result is TPSIGN_REVOKED_CERT.
4. If any signature is TPSIGN_POSTDATED, then the result is TPSIGN_POSTDATED.
5. If any signature is TPSIGN_EXPIRED_CERT, then the result is TPSIGN_EXPIRED_CERT.
6. If any signature is TPSIGN_OK, then the result is TPSIGN_OK.
7. If any signature is TPSIGN_EXPIRED, then the result is TPSIGN_EXPIRED.
8. Otherwise, the result is TPSIGN_UNKNOWN. This is also the result for a message buffer with no attached signatures.

These are the default rules for determining a message buffer's signature status. Other sets of rules can be used to account for other situations. If more complex signature analysis is required, an application may call tpenvelope( ) to examine the individual signature(s). This allows enforcement of rules such as a server's requirement for exactly three specific signatures, with none expired or unknown.

In some embodiments a server process can be configured to automatically sign message buffers whenever they leave the process. This is a convenience to the programmer because fewer API calls are required in a secure application, and allows an existing application to leverage digital signature technology with minimal coding changes. It also enhances security by reducing the possibility of programming errors that result in an unsigned buffer being sent over an insecure network.

Automatic signature generation is enabled by opening a key with an TPKEY_AUTOSIGN flag. To enable digital signature, the process must prove its right to act under the signing principal's identity and access the principal's private key. One form of proof is to supply a secret pass phrase or password. Proof requirements may vary, depending on security provider.

A service may require a valid digital signature on all incoming request messages, based on an administrative policy. If this policy is in effect, an incoming service request must have composite signature status TPSIGN_OK or it will not be processed.

A conversational service may require that all incoming messages, sent via tpconnect( ) or tpsend( ), have a valid digital signature, based on an administrative policy. If this policy is in effect, an incoming message must have composite signature status TPSIGN_OK or it will not be processed.

In some embodiments, some subsystems or gateway processes may require a valid digital signature on all incoming posting messages, based on an administrative policy. If this policy is in effect, an incoming posting request must have composite signature status TPSIGN_OK or it will not be processed.

Message-based Digital Signature Software Interfaces

The software and administrative interfaces described below can be used to control aspects of the digital signing process in accordance with one embodiment of the invention. It will be evident to one skilled in the art that other and/or additional interfaces and functions can be used, and that the invention is not limited to the interfaces described below.

tpsign( )

tpsign( ) marks a message buffer for signing with a digital signature. The signature is actually generated in the future, whenever the message buffer is about to be transmitted from the process.

tpenvelope( )

tpenvelope( ) returns status information about a message buffer's attached digital signature(s) and encryption envelope(s). Attached items are numbered zero through N-1, and tpenvelope( ) returns information about the item at a specific position. It also is possible to remove an item from a buffer's occurrences list by specifying the TPKEY_REMOVE flag to tpenvelope( ).

tpexport( )

tpexport( ) converts a message buffer to an externalized representation, which includes any associated digital signatures or encryption envelopes.

tpimport( )

tpimport( ) converts an externalized representation back into a message buffer. During this process decryption is performed, if necessary, and any attached digital signatures are verified.

tpkey_open( ), tpkey_close( ), tpkey_getinfo( ), tpkey_setinfo( )

These functions allow an application to manage its private key or keys for generating digital signatures. Keys are represented and manipulated via handles. There are different key types, for different purposes. A key may play one or more of these roles:

- Encryption: the key represents and identifies the intended recipient of an encrypted message.
- Decryption: the key identifies the calling process as the principal allowed to decrypt a private message, and provides access to the principal's private key necessary for decryption.
- Signature generation: the key identifies the calling process as a specific principal authorized to generate a digital signature under the principal's identity, and provides access to the principal's private key necessary to produce a signature.
- Signature verification: the key represents and identifies a principal associated with a digital signature.

Digital signature options may be read with tpkey_getinfo( ) and set with tpkey_setinfo( ). Each provider is expected to supply a default mode of operation, but might allow different options to be set. A SIGNATURE_ALG key attribute controls the signature algorithm. A DIGEST_ALG key attribute controls the message digest algorithm. A SIGNATURE_BITS attribute controls the algorithm's bit length. Note that some of these attributes may have been fixed when the signature key was generated, so even if a provider supports multiple options, one might not be able to set them on a specific key. Key handles are opened several ways:

By an explicit call to tpkey_open( ).
As output from tpenvelope( ).

It is the application's responsibility to release key resources by calling tpkey_close( ). Once a key has been closed, the handle may no longer be used. Keys with automatic properties (TPKEY_AUTOSIGN for automatic signing or TPKEY_AUTOENCRYPT for automatic encrypting) no longer apply to future communication operations after they are closed. Keys which have been associated with a specific buffer (for signature or encryption) remain associated with that buffer and still are processed. When the last buffer associated with a closed key is freed or overwritten, resources attributable to the key are released.

If a key expires or is revoked after it is opened, the key holder need not be notified immediately. There is no requirement to check a key's status on every use. However, other processes may not accept signature or encryption envelopes produced with an expired key.

Message-based Digital Signature Administrative Interfaces

A number of administrative parameters related to messaging and the use of the digital signature can be specified:

Signature Timestamp Window: SIGNATURE_AHEAD

This parameter limits how far into the future, according to the verifying system's local clock, a valid signature's timestamp may be. If a signature's timestamp is more than this offset into the future, the signature is considered invalid. This parameter is useful for rejecting signatures that are postdated, while allowing a certain amount of leeway for unsynchronized local clocks. The SIGNATURE_AHEAD parameter's units are seconds.

Signature Timestamp Windows: SIGNATURE_BEHIND

This parameter limits how far into the past, according to the verifying system's local clock, a valid signature's timestamp may be. If a signature's timestamp is more than this offset into the past, the signature is considered invalid. This parameter is useful for resisting replay attacks, where a valid signed buffer is injected into the system a second time. However, in a system with asynchronous communication, for example using disk-based queues, buffers signed quite long ago may still be considered valid and this parameter should be increased. The SIGNATURE_BEHIND parameter's units are seconds.

Incoming Message Signature Enforcement Policy: SIGNATURE_REQUIRED

This is a Y/N parameter which may be specified at multiple levels in the configuration hierarchy. If this policy is specified, any incoming message subject to one or more Y configuration values must include a valid digital signature.

- At the domain level (T_DOMAIN class or *RESOURCES section), this parameter covers all application services advertised within the domain, including those advertised by gateway processes. The default value is N.
- At the machine level (T_MACHINE class or *MACHINES section), this parameter covers all application services advertised on a particular machine, including those advertised by gateway processes. The default value is N.
- At the group level (T_GROUP class or *GROUPS section), this parameter covers all application services advertised by a particular group, including those advertised by gateway processes. The default value is N.
- At the service level (T_SERVICE class or *SERVICES section), this parameter covers all instances of a particular service advertised within the domain, including advertisement by gateway processes. The default value is N.

The policies described above apply only to application services, application events, or application enqueue requests. They do not apply to system-generated service invocations, system event postings, timeout messages, transaction management messages, or other system messages.

In order to verify a signature associated with an encrypted message, the process must have opened a valid decryption key. Without access to the message's contents, signatures cannot be verified. As a consequence, if intermediate system processes such as an Event Broker are configured to enforce signature policies, inaccessible encrypted messages might be rejected.

It may be desirable in certain customer environments to require digital signatures on event postings, to provide authentication of the poster's identity and integrity protection of the message's contents. When a posted message buffer has digital signatures attached, these signatures are preserved and forwarded along with the message buffer to subscribers for that event.

For example, in a Tuxedo system, if the TMUSREVT system server process is running in a domain, machine, or server group that requires digital signatures, it will reject any incoming posting without a TPSIGN_OK composite signature status. System events (those posted by the system itself and processed by the TMSYSEVT system server process) do not have digital signatures attached. Administrative policies requiring digital signatures do not apply to the TMSYSEVT server.

Possible subscription notification actions the TMUSREVT server might take include invoking a service or enqueuing a message. If the target service or queue requires a valid digital signature, but one is not attached to the posted message, the subscription notification action will fail.

It may be desirable in certain customer environments to require digital signatures on messages stored in a reliable disk-based queue, to provide of authentication of the originator's identity and integrity protection of the message's contents. When a queued buffer has digital signatures attached, these signatures are preserved in the queue and returned to the dequeuing process. If the message is processed by TMQFORWARD to invoke a service, signatures are also preserved.

If the TMQUEUE system server process is running in a domain, machine, or server group that requires digital signatures, it will reject any incoming enqueue request without a TPSIGN_OK composite signature status. In addition, the TMQUEUE server process requires a digital signature if such a policy is in effect for the service name associated with the queue space.

Remote workstation clients are susceptible to session hijacking attacks or message tampering attacks. It therefore might be necessary for the system to enforce a policy requiring a digital signature on all messages buffers transmitted by a client. For security reasons, this policy requirement must be enforced at the incoming gateway process, not in the client library functions.

If the gateway process is running in a domain, machine, or server group that requires digital signatures, it will reject any incoming message buffer containing application data without a TPSIGN_OK composite signature status.

Message-based Digital Signature Failure Reporting and Auditing

If message tampering is detected (composite signature status TPSIGN_TAMPERED_MESSAGE or TPSIGN_TAMPERED_CERT), these actions are taken:
  A userlog( ) error message is generated (Severity ERROR).
  A security violation system event is posted.
  The buffer is discarded as if it were never received by the process.

If any individual signature associated with an expired certificate, revoked certificate, expired signature, or post-dated signature is detected, these actions are taken:
  A userlog( ) warning message is generated.
  A security violation system event is posted.
  If the buffer's composite signature status is not TPSIGN_OK or TPSIGN_UNKNOWN, it is discarded as if it were never received by the process.

If a process that requires a valid digital signature receives a message with composite signature status TPSIGN_UNKNOWN, these actions are taken:
  A userlog( ) warning message is generated.
  A security violation system event is posted.
  The buffer is discarded as if it were never received by the process.

In the case of tpimport( ) there is a need to return the buffer even if it has signature problems. This allows the importing process to examine attached signatures in more detail.

Additional Features

The following capabilities may also be included in other embodiments of the invention:

1. Integration with third-party security products: smart cards, LDAP directories, etc.
2. An originating process may be configured to request or require that its response message be signed or encrypted. Signature/encryption status might be enforced implicitly by system policy options or explicitly by querying a message buffer's status.
3. Key escrow/key recovery provisions, to facilitate covert third-party access to encrypted messages.
4. Signing of communication parameters in addition to message content. The service name, event name, or queue name may be included in a digital signature calculation. Binding data to an operation verb with a digital signature improves security, but at there is one significant drawback: loss of server-tier transparency and transitive operations. For example: if service A forwards a signed message to service B, the second-level service should be able to receive and verify a digital signature on the message's content. It should not fail because the originator's signature included a different service name. If for some reason an intended operation needs to be included and signed, this can be added to the message content in an application-specific field.
5. Signing buffer type and subtype in addition to content. The buffer type string and buffer subtype string may be included in a digital signature calculation. The specification includes buffer type and subtype as part of the authenticated content data.
6. Message archiving. The ability to make an archive copy of a message buffer, along with associated signatures and/or encryption envelopes, may enhance non-repudiation capabilities. It also enables application architectures where an encrypted message needs to be transported through intermediate processes without access to a decryption key.
7. Compliance with industry message format standards. Some embodiments may be designed to support industry-standard data formats for attaching encryption envelopes and digital signatures.
8. Gateway processes might inhibit replay attacks by enforcing monotonically increasing signature timestamp values.
9. Special certificate attributes. Transaction server issued certificates might contain supplemental, proprietary policy attributes describing the user, for example, how securely the user's private key is stored, or restrictions on the certificate's usage such as signature-only.
10. A "fully automatic" operation mode is possible, based solely on administrative parameters. This is desirable for easy deployment of this feature without any client or server code changes. A plug-in architecture allows private keys to be opened in "automatic" mode separately from application code. This allows an existing system to benefit from public key features with minimal change.
11. Support for the "IDEA" symmetric bulk data encryption algorithm.
12. Support for the "AES" symmetric bulk data encryption algorithm, when selected and formally standardized by the US Government.
13. Protecting message headers and system messages. Message-based encryption can prevent disclosure of system control information, such as transaction identifiers. Message-based digital signature protects against impersonation attacks and tampering with system integrity, for example an attack which forges TMS commit processing messages. Both threats, if from a network-based attacker, are partially addressed by link-level encryption. The incremental security benefit may not be worth the complexity, key distribution issues, and performance impact.
14. Protecting administrative messages. Public key capabilities can enhance the system's administrative security and system process integrity by protecting administrative messages. However, there are complex key distribution, process identification, and performance issues.
15. Expanded support, for example COBOL support can be improved by making public key operations implicitly associated with the next (or previous) operation. For example, TPENVELOPE can return information about the last message received by the process, and TPSIGN can have a side effect on the next message origination. However, this type of "side effect" interface has difficult semantic problems with threads and asynchronous operations (like unsolicited notifications).
16. Additional administrative policies allow or disallow expired signatures. There may be value in distinguishing between a message with no attached signatures and a message with attached but unrecognized signatures. It is possible for a recipient to make these distinctions by calling tpenvelope( ) to examine attached signatures.
17. Additional administrative parameter is provided to require reply signature. This proposal enables administrative policies that control relationships between request and reply buffers. For example, if a request buffer is encrypted for a particular server recipient, the reply message would be required to be signed by that recipient. Such policies can be enforced by application logic, but are "stronger" if enforced by administrative policies. Such policies can be complex, especially when there are multiple encryption recipients or non client/server interactions such as event postings.
18. Additional administrative parameters regarding signature or encryption policies be added to the Domain configuration files. Another idea is to allow gateway processes to add signatures or add/strip encryption envelopes under their own identity. Some control over gateway destinations is available based on service, group, machine, or domain-level administrative parameters.
19. Client option to require digital signature or encryption. Some tpinit( ) options may allow client control over encryption and signature policies. In particular, the client can express a desire to receive only encrypted messages, and/or only signed messages.
20. Access control decision is based on digital signature. If a message buffer has one or more valid attached digital signature, ACL decisions can be based on the signature identity, rather than the user's tpinit( ) identity.
21. Authentication decision is based on digital signature. Authentication servers might validate claimed identity based on an attached digital signature.
22. Reuse bulk encryption keys to boost performance. Reusing bulk data encryption keys for more than one message may save expensive public key operations. For example, during a conversational client/server exchange, the same bulk data encryption key can be used many times. One drawback is that security might be reduced, since a brute-force attack would crack more messages. It also is important that a bulk data encryption key not be "leaked" to an unauthorized party who was designated as a recipient of some messages encrypted with the key, but not all.
23. Callback function invoked when private key needed. There may be situations where a process needs a certain private key for signature generation or decryption, but the key has not been previously opened. A callback function may allow the application a "last chance" to open it before failure.
24. Ability to allow customized compression algorithm per buffer type. The compression algorithm may be customizable based on a buffer type switch hook function.
25. A new S/MIME buffer can enhance interoperability between clients/servers and mail gateways.
26. Countersignatures. It is possible under for example, PKCS7 formatting to assign a countersignature to a specified signature within that buffer. A countersignature indicates that some entity signs that another entity has signed the buffer (much like the function of a notary). This functionality can be achieved crudely with the tpexport( ) verb.
27. Hook function to supply additional pseudo-random seed material. If an application environment has access to hardware-generated random seed material, or some other good source, transaction servers such as TUXEDO may accept it.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for secure communication of data from a sender process to a recipient process in a transaction processing system, comprising the steps of:
storing data from a series of electronic messages containing transaction data in a message buffer;
marking said message buffer for encryption;
marking said message buffer for attachment of a digital signature;
creating an encryption envelope by encrypting said message buffer, and signing the encrypted contents of said message buffer with a digital signature using a signed data content type, wherein a time stamp is attached to the digital signature;
sending said encryption envelope from said sender process to said recipient process;
receiving said encryption envelope from said sender process;
checking a policy to determine if said message buffer as received will be honored, wherein the policy comprises requiring at least one valid digital signature on the message buffer, requiring that the message buffer is encrypted, and limits on the acceptable range of timestamps associated with the digital signature;
rejecting said message buffer if said message buffer will not be honored based on said policy; and
accepting said message buffer if said message buffer will be honored based on said policy by decrypting said encryption envelope to retrieve said data and verifying the identity of said sender process by retrieving said digital signature from said encryption envelope; and wherein the recipient process can be a client, a particular service, a server group, a gateway group, a particular server machine, or an entire domain of servers.

2. A method for secure communication of data from a sender process to a recipient process in a transaction processing system, comprising the steps of:
   storing data from a series of electronic messages containing transaction data in a message buffer;
   exporting the contents of said message buffer to an external representation of said message buffer, said step of exporting includes the substeps of
   marking said message buffer for encryption,
   marking said message buffer for attachment of a digital signature identifying said sender process, wherein a time stamp is attached to the digital signature, and,
   creating an encryption envelope by encrypting said message buffer, and signing the encrypted contents of said message buffer with a digital signature;
   sending said encryption envelope from said sender process to said recipient process; and
   importing said encryption envelope by said recipient process, said step of importing includes the substeps of
   checking a policy to determine if said message buffer as received will be honored, wherein the policy comprises requiring at least one valid digital signature on the message buffer, requiring that the message buffer is encrypted, and limits on the acceptable range of timestamps associated with the digital signature;
   if said message buffer will not be honored based on said policy, rejecting said message buffer, otherwise the step of importing includes the substeps of
   decrypting said encryption envelope to retrieve said data, wherein the data is readable by said recipient process; and,
   verifying the identity of said sender process by retrieving said digital signature from said encryption envelope; and
   wherein the recipient process can be a client, a particular service, a server group, a gateway group, a particular server machine, or an entire domain of servers.

3. The method of claim 2 wherein said step of creating an encryption envelope includes the substeps of:
   generating at said sender process a message key;
   combining said message key with the contents of said message buffer to create an encrypted message buffer;
   generating a decryption key from a public key associated with said recipient process; and,
   placing said encrypted message buffer and said decryption key in said encryption envelope.

4. The method of claim 2 wherein said step of signing includes the steps of:
   generating a message digest from said message buffer;
   retrieving a private key associated with said sender process; and,
   combining said message digest with said private key to create a digital signature; and,
   placing said digital signature in said encryption envelope.

5. The method of claim 3 wherein said step of decrypting includes the steps of:
   receiving said encryption envelope;
   combining said encryption envelope with a private key associated with said recipient process;
   retrieving said decryption key;
   using said decryption key to retrieve said encrypted message buffer; and,
   decrypting said encrypted message buffer to retrieve said data.

6. The method of claim 4 wherein said step of verifying includes the steps of:
   receiving data including said digital signature;
   generating a first message digest from said digital signature;
   generating a second message digest, said step of generating a second message digest including the steps of
   retrieving a public key associated with said sender process, and,
   combining said senders public key with said digital signature to generate a second message digest; and,
   comparing said first and second message digest to determine the validity of the digital signature sent with the data.

7. The method of claim 2, wherein an encrypted message buffer is signed using a signed data content type.

8. The method of claim 2, wherein more than one digital encryption envelope can be associated with an encrypted message buffer.

9. The method of claim 8, wherein multiple processes with different private keys can receive and decrypt an encrypted message buffer.

10. The method of claim 2 wherein said step of sending includes sending said message via an intermediate process, said step of sending said message via an intermediate process includes the substeps of
    placing at said send process said encryption envelope in a second encryption envelope;
    receiving at said intermediate process said encryption envelope;
    verifying the identity of the sender process by retrieving said digital signature from said encryption envelope; and,
    if said identity is valid, forwarding said encryption envelope to said recipient process.

11. The method of claim 2, wherein digital signatures are generated and verified when crossing process boundaries.

12. The method of claim 2, wherein an intermediate process can route a message based on partial application content data, while maintaining confidentiality of the remaining data.

13. The method of claim 2, wherein encryption is performed when crossing process boundaries.

14. The method of claim 2, wherein an intermediate process can decrypt an entire message in order to route a message based on complete application data.

15. A system for secure communication of data from a sender process to a recipient process in a transactions processing system, comprising computer-readable instructions for performing the steps of:
    storing data from a continuous stream of transaction data in a message buffer;
    exporting the contents of said message buffer to an external representation of said message buffer, said step of exporting includes the substeps of
    marking said message buffer for encryption,
    marking said message buffer for attachment of a digital signature in said sender process, wherein a time stamp is attached to the digital signature, and,
    creating an encryption envelope by encrypting said message buffer, and signing the encrypted contents of said message buffer with a digital signature;
    sending said encryption envelope from said sender process to said recipient process; and importing said encryption envelope by said recipient process, said step of importing includes the substeps of
checking a policy to determine if said message buffer as received will be honored, wherein the policy comprises requiring at least one valid digital signature on the message buffer, requiring that the message buffer is encrypted, and limits on the acceptable range of timestamps associated with the digital signature;
if said message buffer will not be honored based on said policy, rejecting said message buffer, otherwise the step of importing includes the substeps of
decrypting said encryption envelope to retrieve said data, wherein the data is readable by said recipient process; and,
verifying the identity of said sender process by retrieving said digital signature from said encryption envelope; and
wherein the recipient process can be a client, a particular service, a server group, a gateway group, a particular server machine, or an entire domain of servers.

16. The system of claim 15 wherein said instructions for creating an encryption envelope includes the substeps of:
generating at said sender process a message key;
combining said message key with the contents of said message buffer to create an encrypted message buffer;
generating a decryption key from a public key associated with said recipient process; and,
placing said encrypted message buffer and said decryption key in said encryption envelope.

17. The system of claim 15 wherein said instructions for signing includes the steps of:
generating a message digest from said message buffer;
retrieving a private key associated with said sender process; and,
combining said message digest with said private key to create a digital signature; and,
placing said digital signature in said encryption envelope.

18. The system of claim 16 wherein said instructions for decrypting includes the steps of:
receiving said encryption envelope;
combining said encryption envelope with a private key associated with said recipient process;
retrieving said decryption key;
using said decryption key to retrieve said encrypted message buffer; and,
decrypting said encrypted message buffer to retrieve said data.

19. The system of claim 17 wherein said instructions for verifying includes the steps of:
receiving data including said digital signature;
generating a first message digest from said digital signature;
generating a second message digest, said step of generating a second message digest including the steps of
retrieving a public key associated with said sender process, and,
combining said senders public key with said digital signature to generate a second message digest; and,
comparing said first and second message digest to determine the validity of the digital signature sent with data.

20. The system of claim 15, wherein the external representation of the message buffer is signed using a SignedData content type.

21. The system of claim 15, wherein more than one digital encryption envelope can be associated with an encrypted message buffer.

22. The system of claim 21, wherein multiple processes with different private keys can receive and decrypt an encrypted message buffer.

23. The system of claim 15, wherein digital signatures are generated and verified when crossing process boundaries.

24. The system of claim 15, wherein an intermediate process can route a message based on partial application content data, while maintaining confidentiality of the remaining data.

25. The system of claim 15, wherein encryption is performed when crossing process boundaries.

26. The system of claim 15, wherein an intermediate process can decrypt an entire message in order to route a message based on complete application data.

* * * * *

UNITED STATES PATENT AND TRADEMARK OFFICE
CERTIFICATE OF CORRECTION

| | | |
|---|---|---|
| PATENT NO. | : 7,363,495 B2 | Page 1 of 1 |
| APPLICATION NO. | : 10/080358 | |
| DATED | : April 22, 2008 | |
| INVENTOR(S) | : Felt et al. | |

It is certified that error appears in the above-identified patent and that said Letters Patent is hereby corrected as shown below:

Title Page, Item (56)

On page 2, in column 2, under "Other Publications", line 6, after "187" delete "." and insert -- , --, therefor.

In column 5, line 4, delete ""enveloping'" and insert -- "enveloping" --, therefor.

In column 12, line 28, after "with" delete "the".

In column 13, line 27, delete "withing" and insert -- within --, therefor.

In column 19, line 1, delete "tht" and insert -- that --, therefor.

In column 30, line 61, in claim 15, delete "in" and insert -- identifying --, therefor.

Signed and Sealed this

Ninth Day of February, 2010

David J. Kappos
*Director of the United States Patent and Trademark Office*